(12) United States Patent
Ujiie et al.

(10) Patent No.: US 10,986,008 B2
(45) Date of Patent: Apr. 20, 2021

(54) ABNORMALITY DETECTION IN AN ON-BOARD NETWORK SYSTEM

(71) Applicant: Panasonic Intellectual Property Corporation of America, Torrance, CA (US)

(72) Inventors: Yoshihiro Ujiie, Osaka (JP); Tomoyuki Haga, Nara (JP); Manabu Maeda, Osaka (JP); Hideki Matsushima, Osaka (JP); Takeshi Kishikawa, Osaka (JP); Junichi Tsurumi, Osaka (JP); Hisashi Kashima, Kyoto (JP); Yukino Toriumi, Kyoto (JP); Takuya Kuwahara, Mie (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 16/026,040

(22) Filed: Jul. 2, 2018

(65) Prior Publication Data
US 2018/0316584 A1    Nov. 1, 2018

Related U.S. Application Data

(63) Continuation of application No. PCT/JP2016/087134, filed on Dec. 14, 2016.

(30) Foreign Application Priority Data

Jan. 8, 2016   (JP) .............................. JP2016-003035
Oct. 31, 2016  (JP) .............................. JP2016-212574

(51) Int. Cl.
*H04L 12/26*     (2006.01)
*H04L 12/40*     (2006.01)
(Continued)

(52) U.S. Cl.
CPC .......... *H04L 43/0823* (2013.01); *H04L 12/40* (2013.01); *H04L 41/145* (2013.01);
(Continued)

(58) Field of Classification Search
CPC ... H04L 43/0823; H04L 12/40; H04L 41/145; H04L 63/1416; H04L 2012/40215;
(Continued)

(56) References Cited

U.S. PATENT DOCUMENTS 8,955,130 B1     2/2015  Kalintsev et al.
2014/0328352 A1* 11/2014 Mabuchi ............. H04L 12/4035
                                                                370/451
(Continued)

FOREIGN PATENT DOCUMENTS

CN      103999410 A    8/2014
JP      2006-287739   10/2006
(Continued)

OTHER PUBLICATIONS

International Search Report of PCT application No. PCT/JP2016/087134 dated Mar. 14, 2017.
(Continued)

*Primary Examiner* — Thai Nguyen
*Assistant Examiner* — Brian T Le
(74) *Attorney, Agent, or Firm* — Greenblum & Bernstein, P.L.C.

(57) ABSTRACT

An abnormality detection method is provided. The abnormality detection method is for detecting an abnormality that may be transmitted to a bus in an on-board network system. The on-board network system includes a plurality of electronic controllers that transmit and receive messages via the bus in a vehicle according to a CAN protocol. In the abnormality detection method, for example, a gateway transmits vehicle identification information to a server and
(Continued)

receives a response determining a unit time. An operation process is performed using feature information based on a number of messages received from the bus per the determined unit time and using a model indicating a criterion in terms of a message occurrence frequency. A judgment is made as to an abnormality according to a result of the operation process.

16 Claims, 18 Drawing Sheets

(51) Int. Cl.
*H04L 29/06* (2006.01)
*H04W 4/48* (2018.01)
*H04L 12/24* (2006.01)

(52) U.S. Cl.
CPC ........... *H04L 63/1416* (2013.01); *H04W 4/48* (2018.02); *H04L 2012/40215* (2013.01); *H04L 2012/40273* (2013.01)

(58) Field of Classification Search
CPC ........... H04L 2012/40273; H04L 12/28; H04L 29/06; H04L 43/0829; H04L 43/0835; H04L 43/0841; H04L 43/0847; H04L 12/40071; H04L 12/4015; H04L 63/1425; H04L 63/1408; H04L 63/14; H04L 2012/40267; H04L 2012/4026; H04W 4/48

See application file for complete search history.

(56) References Cited

U.S. PATENT DOCUMENTS

2017/0013005 A1\* 1/2017 Galula ................. H04L 63/123
2017/0026386 A1 1/2017 Unagami et al.

FOREIGN PATENT DOCUMENTS

| JP | 2009-035237 | 2/2009 |
| JP | 2015-026252 | 2/2015 |
| JP | 2015-170121 | 9/2015 |
| WO | 2015/159520 | 10/2015 |

OTHER PUBLICATIONS

The Extended European Search Report from the European Patent Office (EPO) dated Dec. 6, 2018 for the related European Patent Application No. 16883746.6.
English Translation of Chinese Search Report dated Aug. 19, 2020 for the related Chinese Patent Application No. 201680051251.X.

\* cited by examiner

FIG. 4

| RECEPTION ID LIST |
|---|
| 1 |
| 2 |
| 3 |
| 4 |

FIG. 5

| ID | DATA |
|---|---|
| 1 | 0 |
| 1 | 1 |
| 1 | 2 |
| 1 | 3 |
| 1 | 4 |
| ... | ... |

FIG. 6

| ID | DATA |
|---|---|
| 2 | 100 |
| 2 | 90 |
| 2 | 80 |
| 2 | 70 |
| 2 | 60 |
| ... | ... |

FIG. 7

| ID  | DATA |
|-----|------|
| 3   | 1    |
| 3   | 1    |
| 3   | 0    |
| 3   | 0    |
| 3   | 0    |
| ... | ...  |

FIG. 8

| ID  | DATA |
|-----|------|
| 4   | 0    |
| 4   | 10   |
| 4   | 20   |
| 4   | 30   |
| 4   | 40   |
| ... | ...  |

| CAR MAKER | TYPE | CHASSIS NUMBER | |
| --- | --- | --- | --- |
| | | MODEL | SERIAL NUMBER |
| A COMPANY | AX | AX-A001 | 10101010101010101 |

| TRANSFER SOURCE | TRANSFER DESTINATION | ID |
| --- | --- | --- |
| 200a | 200b | * |
| 200b | 200a | 3 |

| CAR MAKER | TYPE | CHASSIS NUMBER | | DETECTION WINDOW SIZE [ms] |
| --- | --- | --- | --- | --- |
| | | MODEL | SERIAL NUMBER | |
| A COMPANY | AX | AX-A001 | 10101010101010101 | 10 |
| A COMPANY | AC | AC-R002 | 10101010103010102 | 20 |
| A COMPANY | AD | AD-K003 | 10101010102010102 | 40 |
| B COMPANY | BA | BA-E001 | 10201010101010105 | 12 |
| B COMPANY | BE | BE-B002 | 10201010102010101 | 24 |
| C COMPANY | CK | CK-J001 | 10301010103010109 | 48 |

ABNORMALITY DETECTION IN AN ON-BOARD NETWORK SYSTEM

BACKGROUND

1. Technical Field

The present disclosure relates to a technique of detecting an abnormality in a message transmitted in an on-board network.

2. Description of the Related Art

In systems in vehicles according to recent techniques, many apparatuses called electronic control units (ECUs) are installed. A network via which those ECUs are connected is called an on-board network. There are many standards regarding on-board networks. Among those standards, one of the most major on-board network standards is the CAN (Controller Area Network) standard defined in ISO11898-1.

In CAN, a bus (a CAN bus) including two wires is used as a communication channel, and ECUs connected to the bus are called nodes. Each node connected to the CAN bus transmits and receives a frame (a message). Furthermore, in CAN, no identifier exists to indicate a transmission destination or a transmission source. A transmission node transmits frames each of which is attached with an ID called a message ID (that is, the transmission node performs broadcasting by transmitting a signal to the bus). Each reception node receives only a predetermined message ID (that is, reads a signal from the bus). In a system in a vehicle, each of many ECUs transmits and receives various frames.

There is a possibility that an attacker connects an invalid node to a CAN bus or attacks a portable information terminal or an ECU or the like having a capability of communicating with a communication apparatus outside a vehicle such that the attacked portable information terminal or the ECU is converted to an invalid node, and the attacker transmits an attack frame to the CAN bus to invalidly control the vehicle. The attack frame is a frame that is transmitted by a malicious attacker to the CAN bus and is such a frame (an abnormal message) that is not transmitted when the on-board network is in a normal state.

As one of techniques to detect an attack frame such as that described above, it is known to make a judgment using a statistical method as to whether a frame transmitted on a CAN bus is an abnormal frame or not (see Japanese Unexamined Patent Application Publication No. 2015-026252 and Japanese Unexamined Patent Application Publication No. 2015-170121).

SUMMARY

The techniques disclosed in Japanese Unexamined Patent Application Publication No. 2015-026252 and Japanese Unexamined Patent Application Publication No. 2015-170121 are not necessarily effective enough to detect an attack frame (that is, to detect an abnormality) on an on-board network, and thus there is a need for further research and development of techniques for detecting an abnormality.

One non-limiting and exemplary embodiment provides an abnormality detection method useful for detecting an abnormal message (an attack frame) that may occur in an on-board network in a vehicle such as a car or the like.

In one general aspect, the techniques disclosed here feature a method for an on-board network system including a plurality of electronic controllers that transmit and receive messages via a bus in a vehicle according to a Controller Area Network protocol, the method including determining, by at least one of a processor and a circuit, a unit time, and judging, by the at least one of the processor and the circuit, whether a received message is abnormal or not according to a result of an operation process performed using feature information based on a number of messages received from the bus within the determined unit time and using a model indicating a criterion in terms of message occurrence frequency.

According to the present disclosure, if an attack frame (message) is transmitted to a bus by an attacker, this can lead to a change such that the number of messages received within the unit time determined in the on-board network system is different from the criterion, and thus it is possible to detect an abnormality.

It should be noted that general or specific embodiments may be implemented as an apparatus, a system, an integrated circuit, a method, a computer program, a computer-readable storage medium such as a CD-ROM, or any selective combination thereof.

Additional benefits and advantages of the present disclosure will become apparent from the specification and drawings. The benefits and advantages may be individually obtained by the various embodiments and features of the specification and drawings. However, it does not necessarily need to provide all such benefits and advantages.

BRIEF DESCRIPTION OF THE DRAWINGS

FIG. 4 is a diagram illustrating an example of an acceptance ID list;

FIG. 5 is a diagram illustrating examples of sets each including an ID and a data field for frames transmitted from an engine ECU;

FIG. 6 is a diagram illustrating examples of sets each including an ID and a data field for frames transmitted from a brake ECU;

FIG. 7 is a diagram illustrating examples of sets each including an ID and a data field for frames transmitted from a door open/close sensor ECU;

FIG. 8 is a diagram illustrating examples of sets each including an ID and a data field for frames transmitted from a door open/close sensor ECU;

DETAILED DESCRIPTION

Figure 1:
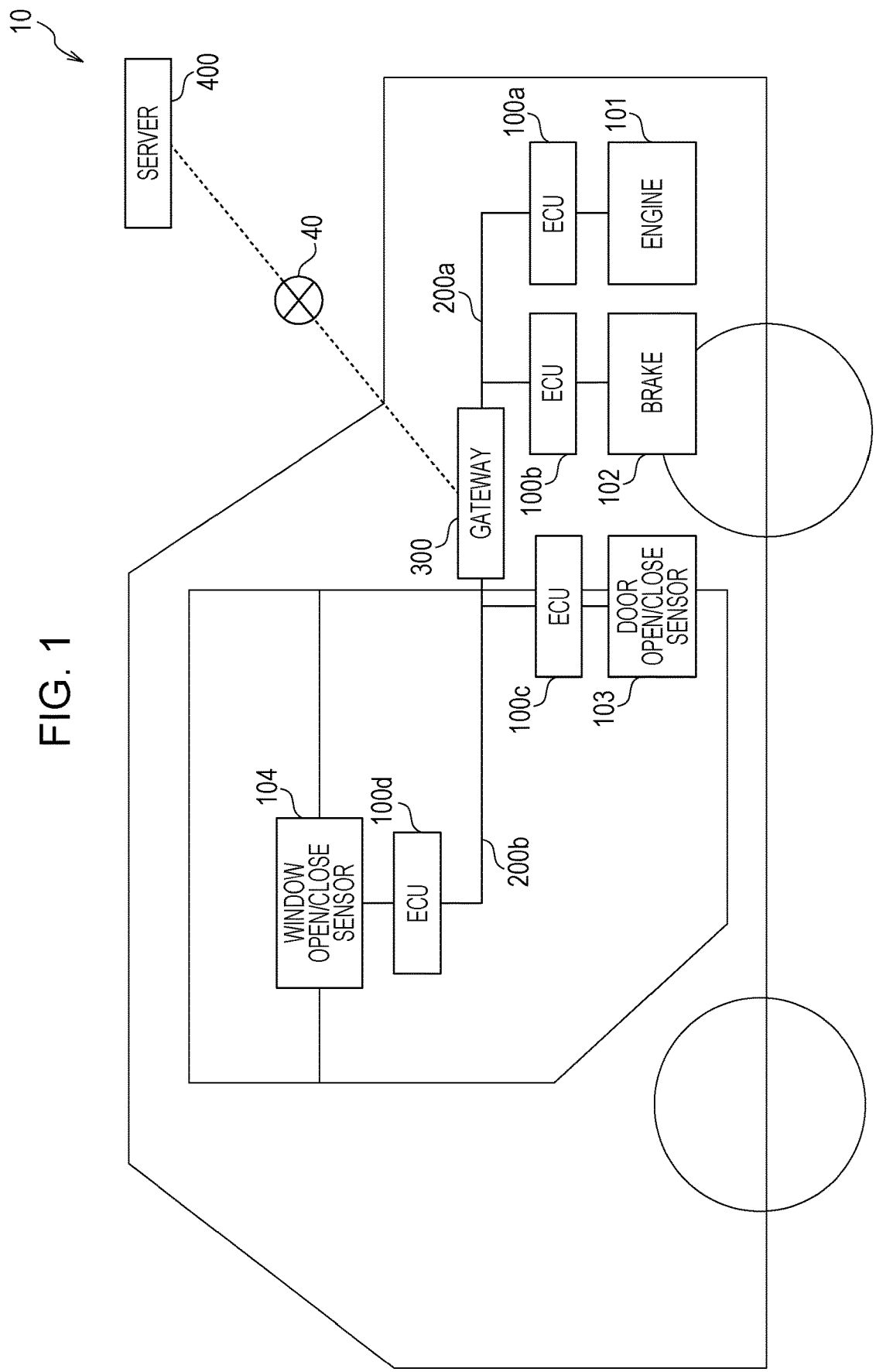
FIG. 1 is a diagram illustrating a total configuration of an abnormality detection system according to a first embodiment.

Underlying Knowledge Forming Basis of the Present Disclosure

When an attack frame (message) is transmitted by an attacker to a bus of an on-board network, if this transmission of the attack frame leads to a change such that the number of frames received from the bus within a unit time becomes different from a criterion (model) indicating a frequency of occurrence of frames within this unit time in a normal state, it is possible to detect an abnormality. This is because the frequency of occurrence of frames on the bus per unit time in the normal state is limited by a configuration and/or specifications of the on-board network system (a configuration and/or specifications of ECUs connected via the bus). Note that the abnormality detection accuracy depends on whether the unit time is proper or not. Thus, an idea has been obtained as to an abnormality detection method in which, in an on-board network system of a vehicle, a unit time is determined (selected) to be, for example, 10 milliseconds from many time periods, and an abnormality is detected using the determined unit time. The on-board network system may be different in configuration, specification, or the like, for example, for each vehicle or each vehicle type, and thus, in the on-board network system of the vehicle, the unit time may be determined, by way of example, based on the vehicle identification information identifying the vehicle, the vehicle type, or the like. A wide variety of new attack methods may appear, and thus the optimum unit time for properly distinguishing between an attacked state and a normal state can be different with time. Therefore, it may be useful to employ a method in which the unit time for detecting an abnormality in the on-board network system of the vehicle is first determined properly and then an abnormality detection is performed. For example, it is useful to determine the unit time used to detect an abnormality based on a result of latest analysis of information on frames accumulated from a plurality of vehicles of the same type.

In an aspect, the present disclosure provides a method for an on-board network system including a plurality of electronic controllers that transmit and receive messages via a bus in a vehicle according to a Controller Area Network protocol, the method including determining, by at least one of a processor and a circuit, a unit time, and judging, by the at least one of the processor and the circuit, whether a received message is abnormal or not according to a result of an operation process performed using feature information based on a number of messages received from the bus within the determined unit time and using a model indicating a criterion in terms of message occurrence frequency. In this aspect, if an attacker transmits an attack frame (message) to the bus, this can cause the number of messages appearing per unit time to be different from the criterion (for example, 10 ms or the like) determined in the on-board network system, and thus it is possible to properly detect an abnormality.

In this method, the received message may include a message ID indicating a message type, and the method may further include identifying, as the feature information, a feature vector including components assigned to respective message IDs corresponding to the number of messages received from the bus and respectively indicating numbers of messages of the assigned message IDs received from the bus within the determined unit time. Thus, the feature vector is determined based on the number received messages such that the feature vector properly indicates the frequencies of occurrence of messages for the respective message types, which makes it possible to properly detect an abnormality.

In this method, in the determining, the unit time may be determined based on vehicle identification information for identifying the vehicle. This makes it possible to detect abnormalities with high accuracy depending on the on-board network system identified by the vehicle identification information.

In this method, the vehicle identification information may indicate a manufacturer of the vehicle. Thus, it is possible to determine the unit time used in detecting an abnormality depending on the feature of the on-board network of each vehicle manufacturer, and thus it becomes possible to detect an abnormality with high accuracy.

In this method, the vehicle identification information may indicate a type of the vehicle. This makes it possible to determine the unit time used in detecting an abnormality depending on the feature of the on-board network of each vehicle type, and thus it becomes possible to detect an abnormality with high accuracy.

In this method, the vehicle identification information may be information that distinguishes the vehicle from other vehicles. This makes it possible to detect an abnormality in a manner adapted to the feature of the on-board network system of each vehicle.

In this method, in the determining, the unit time may be determined to be equal to a transmission period of one type of message which is shortest among a plurality of different types of messages to be transmitted in a normal state via a specified in-vehicle bus in a specified on-board network system of a specified vehicle, the specified vehicle included in a set of vehicles and identified by the vehicle identification information. This makes it possible to properly detect an abnormality with high accuracy.

In this method, the model may correspond to the vehicle identification information. Thus, the abnormality detection is performed based on the particular model corresponding to the unit time determined in the on-board network system and the number of messages received in the on-board network per unit time, and thus it becomes possible to properly detect an abnormality.

In this method, in the identifying, the feature information may be identified based on the number of messages received from the bus within the determined unit time, the identifying being performed sequentially for every period having a length equal to the determined unit time, in the judging, the operation process may be performed using the model and each piece of sequentially identified feature information, and the method may further include sequentially updating the model based on each piece of sequentially identified feature information. Thus, the particular model used in the abnormality detection is sequentially updated, and thus, for example, it becomes possible to properly perform the abnormality detection in a manner adapted to a latest state of the on-board network (for example, a latest state in which the vehicle is used).

In this method, in the determining, the unit time may be determined in the vehicle based on information defined when the vehicle was produced, and in the identifying, the feature information may be identified in the vehicle. Thus, based on information (for example, a chassis number or the like) defined when the vehicle was produced, it becomes possible to determine the unit time serving as a basis for generating feature information used in the vehicle in the abnormality detection, and thus it becomes possible to perform the abnormality detection properly depending on the vehicle.

In this method, in the determining, the unit time may be determined in the vehicle when an engine or an accessory of the vehicle is turned on, and in the identifying, the feature information may be identified in the vehicle. Thus, the unit time serving as the basis in generating feature information used in the abnormality detection in the vehicle can be determined when use of the vehicle is started (when driving is started or the like), and thus, for example, it becomes possible to properly detect an abnormality adaptively depending on a recent situation.

In this method, in the determining, the unit time may be determined every predefined time period, in the identifying, the feature information may be identified based on the number of messages received from the bus within the determined unit time, the identifying being performed sequentially for every period having a length equal to the determined unit time, and in the judging, the operation process may be performed using the model and each piece of sequentially identified feature information. Thus, the unit time serving as the basis in generating feature information used in the abnormality detection in the vehicle is determined every predefined time, and thus, for example, it becomes possible to properly detect an abnormality adaptively depending on a recent situation.

In this method, the message may include a message ID indicating a message type, and the feature information may indicate a total number of all messages received from the bus within the determined unit time. Not distinguishing between IDs makes it possible to efficiently perform the abnormality detection.

In an aspect, the present disclosure provides an apparatus in an on-board network system including a plurality of electronic controllers that transmit and receive messages via a bus in a vehicle according to a Controller Area Network protocol, the apparatus connected to the bus, the apparatus including processing circuitry, and a storage including at least one set of instructions that, when executed by the processing circuitry, causes the processing circuitry to perform operations including: receiving a message from the bus; determining a unit time; identifying feature information based on a number of messages received per the determined unit time; and judging whether the received message is abnormal or not according to a result of an operation process performed using the identified feature information and a model indicating a criterion in terms of a message occurrence frequency. The operation process may be performed by the abnormality detection apparatus or an external apparatus (server), and, depending on a result of the operation process, the judgment may be performed by the judger of the abnormality detection apparatus. In a case where the operation process is performed by a server, for example, the abnormality detection apparatus may transmit feature information identified by the identifier to the server, and may receive a result of the operation process from the server. When an attack frame (message) is transmitted by an attacker to the bus, a difference occurs, from the criterion, in the number of messages appearing per unit time (for example, 10 ms) determined by the abnormality detection apparatus, and thus it is possible to properly detect an abnormality.

In an aspect, the present disclosure provides an abnormality detection system including one vehicle; and a server, the one vehicle includes an on-board network system and an abnormality detection apparatus, the on-board network system including a plurality of electronic controllers that transmit and receive messages via a bus in the vehicle according to a Controller Area Network protocol, the abnormality detection apparatus being connected to the bus, the abnormality detection apparatus includes: first processing circuitry; and a first storage including at least one set of instructions that, when executed by the first processing circuitry, causes the first processing circuitry to perform first operations including: receiving a message from the bus; transmitting vehicle identification information for identifying the one vehicle to the server and determining a unit time based on a response returned from the server; identifying feature information based on a number of messages received per the determined unit time; and judging whether the received message is abnormal or not according to a result of an operation process performed using the identified feature information and a model indicating a criterion in terms of a message occurrence frequency, and the server includes: second processing circuitry; and a second storage including at least one set of instructions that, when executed by the second processing circuitry, causes the second processing circuitry to perform second operations including: receiving the vehicle identification information from the one vehicle; and transmitting, to the one vehicle, information indicating the unit time identified based on the vehicle identification information. For example, the judger may transmit the feature information identified by the identifier to the server, and may make a judgment based on a response (for example, information indicating whether the state is abnormal or not) returned from the server as to whether the state is abnormal or not. In this case, for example, the server may perform an operation process associated with the particular model using the received feature information, and may transmit information based on a result of the operation process, as a response to the received feature information, to the vehicle.

This makes it possible to determine the unit time depending on the vehicle identification information of the vehicle, and thus it becomes possible to properly determine whether there is an abnormality in the on-board network of the vehicle.

In this abnormality detection system, the second operations may further include acquiring particular information based on the number of messages received, within the unit time identified based on the vehicle identification information received from the one vehicle, from a specified bus in a specified vehicle in a specified on-board network system, the specified vehicle specified from one or more vehicles in a set of vehicles identified by the vehicle identification information; updating, based on the particular information, the model indicating the criterion in terms of the message occurrence frequency; and transmitting, to the one vehicle, information indicating the updated model, and the first operations may further include updating the model based on the information indicating the model transmitted by the server, and performing the operation process using the feature information and the updated model, and performing the judgment as to whether the received message is abnormal or not according to a result of the operation process. Thus, in the server, the criterion model is updated via learning using particular information (for example, information similar to the feature information) based on the number of messages received in an on-board network in a set of vehicles (for example, vehicles of the same type) identified by the vehicle identification information. In the vehicle abnormality detection apparatus, it is possible to update the particular model based on the criterion model, for example, such that the particular model becomes equal to the criterion model thereby making it possible to use the particular model in judging whether the state is abnormal or not. Therefore, it becomes possible for the abnormality detection apparatus to properly execute detecting (judging) of an abnormality in a manner adapted to a vehicle (a vehicle identified by the vehicle identification information) in which the abnormality detection apparatus is installed.

General or specific embodiments may be implemented by a system, a method, an integrated circuit, a computer program, a computer-readable storage medium such as a CD-ROM, or any selective combination of a system, a method, an integrated-circuit, a computer program, and a storage medium.

An abnormality detection system, an abnormality detection apparatus, and the like using the abnormality detection method according to the embodiment are described below with reference to drawings. Note that each embodiment described below is for illustrating a specific example of an implementation of the present disclosure. In the following embodiments, values, constituent elements, locations of elements, manners of connecting elements, steps, the order of steps, and the like are described by way of example but not limitation. Among constituent elements described in the following embodiments, those constituent elements that are not described in independent claims are optional. Note that each drawing is a schematic diagram, which does not necessarily provide a strict description.

First Embodiment

An embodiment of the present disclosure is described below with reference to drawings for a case in which in an abnormality detection system, abnormality detection apparatus for detecting an abnormality in an on-board network in a vehicle is configured to determine, in cooperation with a server outside the vehicle, a detection window size (a unit time) used in detecting the abnormality. In this abnormality detection system, the abnormality detection apparatus sends, to a server, vehicle identification information on the vehicle in which the abnormality detection apparatus is installed, and determines the detection window size used in detecting an abnormality based on a response returned from the server.

1.1 Total Configuration of Abnormality Detection System 10

FIG. 1 is a diagram illustrating a total configuration of an abnormality detection system 10 according to a first embodiment.

The abnormality detection system 10 includes a vehicle including an on-board network system, and a server 400 capable of mutually communicating with the vehicle. The abnormality detection system 10 may include a plurality of vehicles capable of communicating with the server 400. However, in FIG. 1, for convenience, only one vehicle is shown.

The on-board network system in the vehicle illustrated in FIG. 1 is an example of a network communication system which performs communication according to the CAN protocol, and the on-board network system includes various kinds of devices including a control apparatus, a sensor, an actuator, a user interface apparatus, and the like. This on-board network system includes an ECU 100a (an engine ECU), an ECU 100b (a brake ECU), an ECU 100c (a door open/close sensor ECU), and an ECU 100d (a door open/close sensor ECU), which are respectively connected to various kinds of devices installed in the vehicle, and buss 200a and 200b, and a gateway 300 (an example of the abnormality detection apparatus). Note that the on-board network system may further include other ECUs in addition to the gateway 300 and the ECUs 100a to 100d. However, for convenience, the present description focuses on the gateway 300 and the ECUs 100a to 100d. Each ECU is an apparatus which may include, for example, a digital circuit such as a processor (a microprocessor), a memory, and/or the like, an analog circuit, a communication circuit, and/or the like. The memory may be a ROM, a RAM, or the like and may store a control program (a computer program functioning as software) executed by the processor. For example, the processor operates in accordance with the control program (the computer program) such that the ECU realizes various functions. Note that, to realize a particular function, the computer program includes a plurality of instruction codes indicating instructions issued to the processor. Each ECU is capable of receiving and transmitting frames via the buss 200a and 200b in the vehicle according to the CAN protocol.

The ECUs 100a to 100d are respectively connected to devices such as an engine 101, a brake 102, a door open/close sensor 103, and the ECUs 100a to 100d acquires states of the respective devices and periodically transmit frames (data frames) indicating the states over the on-board network including the bus 200a, the bus 200b, and the like.

The gateway 300 is a kind of an ECU, which is connected to the bus 200a, to which the ECU 100a and the ECU 100b are connected, and the bus 200b, to which the ECU 100c and the ECU 100d are connected, and which has a capability of transferring a frame received from one of the buses to the other one of the buses. Furthermore, the gateway 300 functions as an abnormality detection apparatus having a capability of detecting an abnormality by judging whether a frame received from a bus is abnormal or note (for example, by judging whether an attack frame is transmitted over a bus in an abnormal state), and notifying the server 400 of a detection result (an abnormality detection result). The abnormality detection by the gateway 300 functioning as the abnormality detection apparatus is performed in general such that in each detection window which is a period having a time length corresponding to a detection window size, the judgment as to the abnormality is made based on a result of an operation process such as a process of comparing feature information based on the number of data frames (messages) received within the detection window from the bus 200a or 200b in the on-board network with the particular model indicating the criterion in terms of the message occurrence frequency. The gateway 300 also has a capability of determining information (for example, parameters in terms of the detection window size, the particular model, or the like) for use in detecting abnormality (for making a judgment as to abnormality) via communication with the server 400 via the network 40.

The server 400 is a computer disposed outside the vehicle, and has a capability of communicating with the gateway 300 of each vehicle via the network 40 and returning, as a response, information for use in abnormality detection (information indicating the detection window size or the like) based on the received vehicle identification information to the gateway 300. The server 400 also has a capability of storing the abnormality detection result received from the gateway 300. The server 400 may have a capability of communicating with each gateway 300 in the vehicle and accumulating and analyzing information on frames received by on-board network in each vehicle. Note that the communication via the network 40 may be performed wirelessly or via a cable according to any communication protocol.

1.2 Data Frame Format

The data frame which is one type of frames used in networks according to the CAN protocol is described below.

Figure 2:
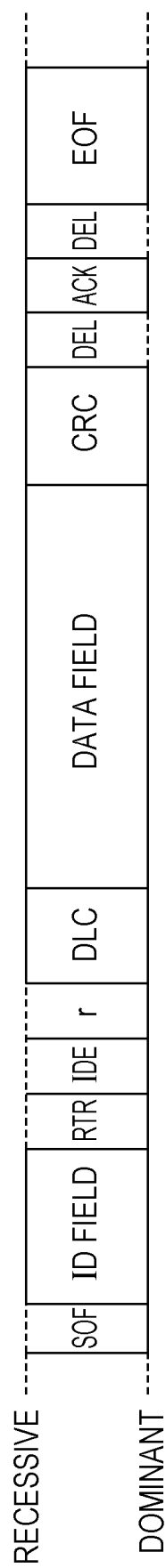
FIG. 2 is a diagram illustrating a data frame format according to the CAN protocol.

FIG. 2 is a diagram illustrating a data frame format according to the CAN protocol. In FIG. 2, the data frame shown is a data frame according to a standard ID format defined in the CAN protocol. The data frame includes fields such as SOF (Start Of Frame), an ID field, RTR (Remote Transmission Request), IDE (Identifier Extension), a reserved bit "r", DLC (Data Length Code), a data field, a CRC (Cyclic Redundancy Check) sequence, a CRC delimiter "DEL", an ACK (Acknowledgement) slot, an ACK delimiter "DEL", and EOF (End Of Frame).

SOF includes a one dominant bit. When the bus is in an idle state, the SOF is in a recessive state. When transmission is started, the SOF is set to dominant thereby providing a notification of start of a frame.

The ID field is a field including 11 bits and storing an ID (a message ID) having a value indicating a data type. When a plurality of nodes start transmission at the same time, communication arbitration is performed according to ID fields such that a frame having a smaller ID value is given a higher priority.

RTR has a value identifying a data frame and a remote frame. In the case of a data frame, RTR has a 1 dominant bit.

IDE and "r" each have one dominant bit.

DLC includes 4 bits indicating a length of the data field. Note that IDE, "r", and DLC are collectively called a control field.

The data field has a value including up to 64 bits indicating a content of data to be transmitted. The length is allowed to be adjusted in units of 8 bits. The specification of the data to be transmitted is not defined in the CAN protocol, but defined in the on-board network system. Therefore, the specification depends on a vehicle type, a manufacturer (a maker), or the like.

The CRC sequence includes 15 bits. The value thereof is calculated based on the transmission values of the SOF, the ID field, the control field, and the data field.

The CRC delimiter is a delimiter including one recessive bit indicating an end of the CRC sequence. Note that the CRC sequence and the CRC delimiter are collectively called a CRC field.

The ACK slot includes 1 bit. When a transmission node performs transmission, the ACK slot is set to recessive. When a reception node normally receives fields until the end of the CRC sequence, the reception node transmits a dominant ACK slot.

The ACK delimiter is a delimiter including one recessive bit indicating an end of ACK.

EOF includes seven recessive bits to indicate an end of the data frame.

1.3 Configuration of ECU 100a

Figure 3:
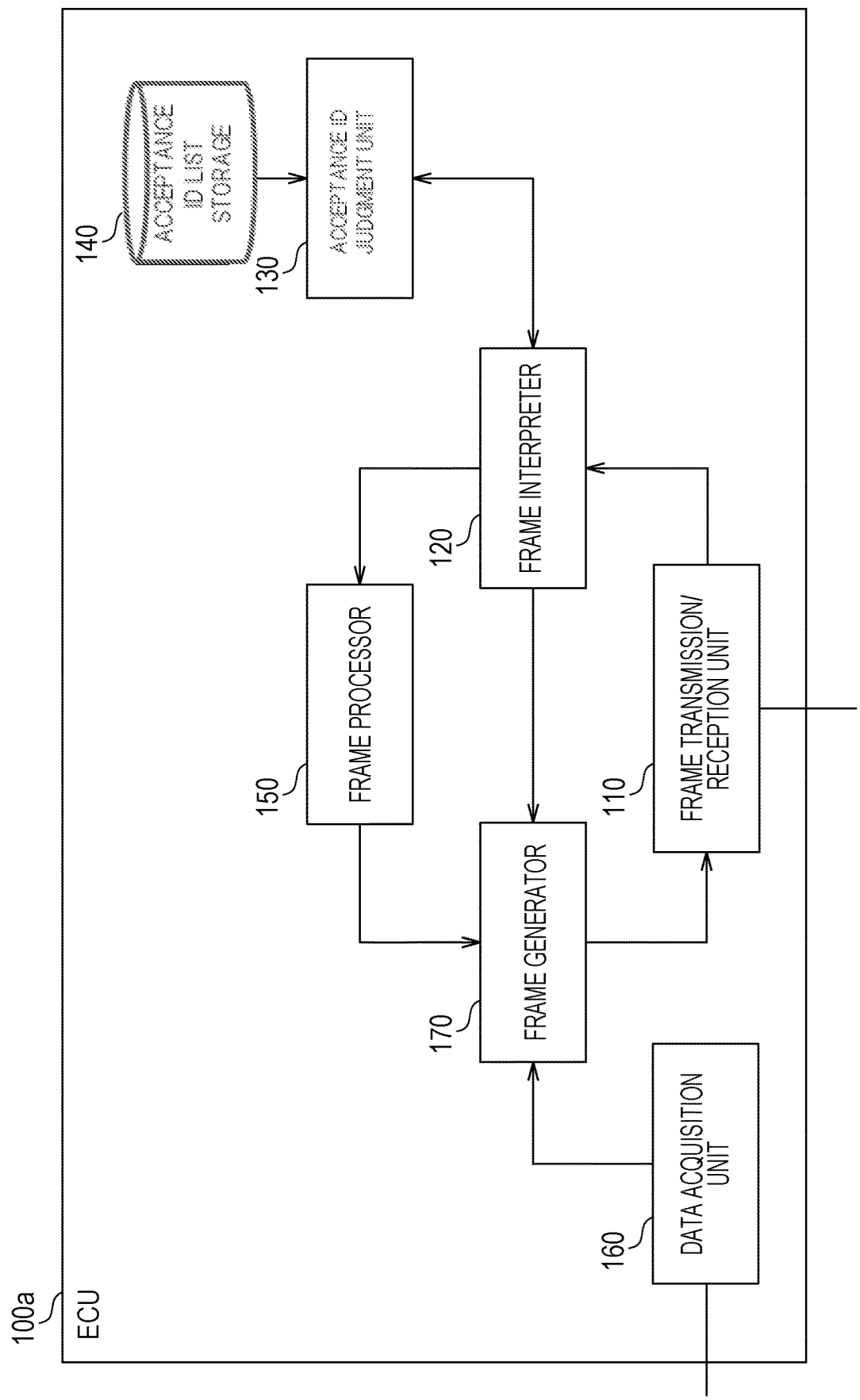
FIG. 3 is a diagram illustrating a configuration of an electronic control unit (ECU)

FIG. 3 is a configuration diagram of the ECU 100a. The ECU 100a includes a frame transmission/reception unit 110, a frame interpreter 120, an acceptance ID judgment unit 130, an acceptance ID list storage 140, a frame processor 150, a data acquisition unit 160, and a frame generator 170. Each function of each of these constituent elements is realized, for example, by a communication circuit in the ECU 100a, a processor, or a digital circuit that executes a control program stored in a memory, or the like. Note that the ECUs 100b to 100d are each have a similar configuration to that of the ECU 100a.

The frame transmission/reception unit 110 transmits and receives frames to or from the bus 200a according to the CAN protocol. A frame is received from the bus 200a on a bit-by-bit basis and transferred to the frame interpreter 120. Furthermore, a content of the frame notified from the frame generator is transmitted to the bus 200a.

The frame interpreter 120 receives values of the frame from the frame transmission/reception unit 110 and interprets the values such that the values are mapped to fields according to the frame format defined in the CAN protocol. A value determined to be mapped to an ID field is transferred to the acceptance ID judgment unit 130. According to a judgment result notified from the acceptance ID judgment unit 130, the frame interpreter 120 determines whether the value of the ID field and data fields appearing following the ID field are to be transferred to the frame processor 150 or further receiving of frames after the judgment is stopped (that is, the further interpretation of frames is stopped). In a case where the judgment of a frame by the frame interpreter 120 is that the frame is not according to the CAN protocol, the frame interpreter 120 notifies the frame generator 170 that an error frame is to be transmitted. In a case where an error frame is received, that is, in a case where the frame interpreter 120 interprets, based on a value of the received frame, that the received frame is an error frame, the frame interpreter 120 discards following frames, that is the frame interpreter 120 stops the interpreting of frames.

The acceptance ID judgment unit 130 receives the value of the ID field notified from the frame interpreter 120 and determines, according to the list of message IDs stored in the acceptance ID list storage 140, whether to receive fields following the ID field in the frame. A judgment result is notified from the acceptance ID judgment unit 130 to the frame interpreter 120.

The acceptance ID list storage 140 stores an acceptance ID list that is a list of message IDs to be received by the ECU 100*a*. FIG. 4 illustrates an example of an acceptance ID list.

The frame processor 150 performs processes that are different depending on ECUs according to data of a received frame. For example, the ECU 100*a* connected to the engine 101 has a function of generating an alarm sound when the vehicle runs at a speed higher than 30 km/hour with a door being in an open state. The ECU 100*a* includes a speaker or the like for generating, for example, an alarm sound. The frame processor 150 of the ECU 100*a* manages data (for example, information indicating the door state) received another ECU, and performs a process of generating an alarm sound under a certain condition according to the speed per hour acquired from the engine 101. Note that the frame processor 150 may perform a process different from the example described above on data of a frame.

The data acquisition unit 160 acquires data indicating a state of a device connected to an ECU and data indicating a state of a sensor or the like, and supplies the acquired data to the frame generator 170.

The frame generator 170 constructs an error frame according to an error frame transmission command given by the frame interpreter 120, and supplies the error frame to the frame transmission/reception unit 110 thereby controlling the frame transmission/reception unit 110 to transmit the error frame. The frame generator 170 also constructs a frame (data frame) such that a predetermined message ID is attached to a data value notified from the data acquisition unit 160, and supplies the resultant frame to the frame transmission/reception unit 110. The content of the frame transmitted by each of the ECUs 100*a* to 100*d* will be described later with reference to FIG. 5 to FIG. 8.

1.4 Example of Acceptance ID List

FIG. 4 is a diagram illustrating an example of an acceptance ID list stored in each of the ECUs 100*a* to 100*d*. The acceptance ID list illustrated by way of example in FIG. 4 is used to selectively receive and process a frame (a message) including a message ID whose value is one of "1", "2", "3", and "4". For example, in a case where the acceptance ID list illustrated in FIG. 4 is stored in the acceptance ID list storage 140 of the ECU 100*a*, when a frame has a message ID different from any one of "1", "2", "3", and "4", the frame interpreter 120 stops the frame interpretation following the ID field.

1.5 Example of Frame Transmitted by Engine ECU 100*a*

FIG. 5 is a diagram illustrating examples of sets each including an ID (a message ID) and a data field (data) for frames transmitted from the ECU 100*a* connected to the engine 101. Each frame transmitted by the ECU 100*a* is assigned "1" as its message ID. The data indicates a speed per hour (km/hour) which is allowed to take a value in a range from a minimum value of 0 (km/hour) to a maximum value of 180 (km/hour). The data length thereof is 1 byte. In FIG. 5, message IDs and data corresponding to frames sequentially transmitted from the ECU 100*a* are described row by row from the top row toward lower rows. In this example, the data indicates that the speed per hour is increased in steps of 1 km/hour starting from 0 km/hour.

1.6 Example of Frame Transmitted by Brake ECU 100*b*

FIG. 6 is a diagram illustrating examples of sets each including an ID (a message ID) and a data field (data) for frames transmitted from the ECU 100*b* connected to the brake 102. Each frame transmitted by the ECU 100*b* is assigned "2" as its message ID. The data represents a degree to which brake is applied in percentage (%), and the data length thereof is 1 byte. When the brake is not applied at all, the value in percentage is 0(%), while when the brake is applied fully, the value in percentage is 100(%). In FIG. 6, message IDs and data of frames sequentially transmitted from the ECU 100*b* are described row by row from the top row toward lower rows. In this example, the data indicates that the brake is reduced gradually starting from 100%.

1.7 Example of Frame Transmitted from Door Open/Close Sensor ECU 100*c*

FIG. 7 is a diagram illustrating examples of sets each including an ID (a message ID) and a data field (data) for frames transmitted from the ECU 100*d* connected to the door open/close sensor 103. Each frame transmitted by the ECU 100*c* is assigned "3" as its message ID. The data represents an open/close state of a door. The data length thereof is 1 byte. When the door is in an open state, the data has a value of "1", while when the door is in a closed state, the data has a value of "0". In FIG. 7, message IDs and data of frames sequentially transmitted from the ECU 100*c* are described row by row from the top row toward lower rows. In this example, data indicates that the open/close state of the door gradually changes from the open state to the closed state.

1.8 Example of Frame Transmitted from Door Open/Close Sensor ECU 100*d*

FIG. 8 is a diagram illustrating examples of sets each including an ID (a message ID) and a data field (data) for frames transmitted from the ECU 100*d* connected to the door open/close sensor 104. Each frame transmitted by the ECU 100*d* is assigned "4" as its message ID. The data represents an open/close state of a window in percentage (%), and the data length thereof is 1 byte. When the window is in a completely closed state, the value in percentage is 0(%), while when the window is in a completely open state, the value in percentage is 100(%). In FIG. 8, message IDs and data of frames sequentially transmitted from the ECU 100*d* described row by row from the top row toward lower rows. In this example, data indicates that the open/close state of the window gradually changes from the closed state to the open state.

1.9 Configuration of Gateway 300

Figure 9:
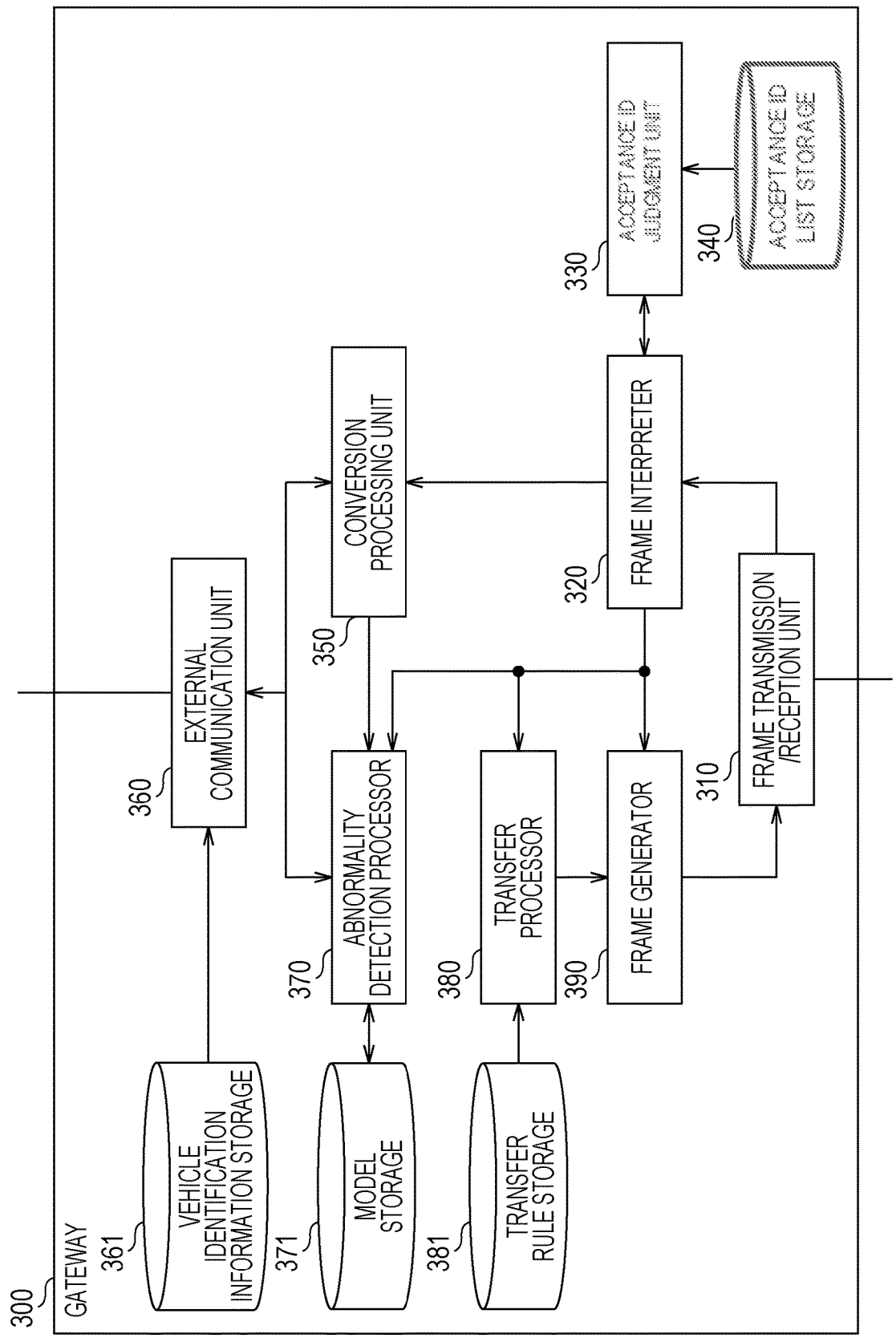
FIG. 9 is a diagram illustrating a configuration of a gateway according to the first embodiment.

FIG. 9 is a diagram illustrating a configuration of the gateway 300. The gateway 300 includes a frame transmission/reception unit 310, a frame interpreter 320, an acceptance ID judgment unit 330, an acceptance ID list storage 340, a conversion processing unit 350, an external communication unit 360, a vehicle identification information storage 361, an abnormality detection processor 370, a model storage 371, a transfer processor 380, a transfer rule storage 381, and a frame generator 390. Each function of each of these constituent elements is realized, for example, by a communication circuit in the gateway 300, a processor, or a digital circuit that executes a control program stored in a memory, or the like.

The frame transmission/reception unit 310 transmits and receives, according to the CAN protocol, frames to and from the bus 200*a* and the bus 200*b* respectively. The frame transmission/reception unit 310 functions as a receiver that receives a frame from the bus on a bit-by-bit basis, and transfers the received frame to the frame interpreter 320. Furthermore, based on a frame and bus information indicating a destination bus received from the frame generator 390, the frame transmission/reception unit 310 transmits a content of the frame to the bus 200a or the bus 200b on a bit-by-bit basis.

The frame interpreter 320 receives values of the frame from the frame transmission/reception unit 310 and interprets the values such that the values are mapped to fields according to the frame format defined in the CAN protocol. A value determined to be mapped to an ID field is transferred to the acceptance ID judgment unit 330. According to a judgment result notified from the acceptance ID judgment unit 330, the frame interpreter 320 determines whether the value of the ID field and the data field (data) following the ID field are to be transferred to the transfer processor 380, or receiving of frames is to be stopped after the judgment result is received. As for a value determined to be mapped to the ID field, the frame interpreter 320 notifies the conversion processing unit 350 of the value of the ID field. In a case where a frame is judged, by the frame interpreter 320, as a frame that is not according to the CAN protocol, the frame interpreter 320 notifies the frame generator 390 that an error frame is to be transmitted. In a case where the frame interpreter 320 receives an error frame, that is, in a case where it is determined, from the received value of the frame, that the received frame is an error frame, the frame interpreter 320 discards the frame thereafter, that is, the frame interpreter 320 stops the interpretation of the frame.

The acceptance ID judgment unit 330 receives the value of the ID field sent from the frame interpreter 320 and judges, according to a list of message IDs stored in the acceptance ID list storage 340, whether to receive fields following the ID field in the frame. The acceptance ID judgment unit 330 notifies the frame interpreter 320 of the determination result.

The acceptance ID list storage 340 stores an acceptance ID list (see FIG. 4) which is a list of IDs (message IDs) that the gateway 300 receives.

The conversion processing unit 350 determines the detection window size based on the information given from the server 400 in terms of the detection window size, and the processing unit 350 holds the determined detection window size. That is, the conversion processing unit 350 functions as a determiner that determines the detection window size. Based on the value of the ID field notified from the frame interpreter 320, the conversion processing unit 350 makes a conversion such that a set of frames sequentially received from the bus 200a or 200b (a set of values of the ID field sequentially notified) in each detection window with a time length corresponding to the detection window size is converted to feature information indicating the number of frames received in the detection window individually for each ID (for each message ID) (that is, the count values obtained by counting the frames received in the detection window with the detection window size individually for the respective IDs), and processing unit 350 sends the feature information to the external communication unit 360. That is, the conversion processing unit 350 also functions as an identifier that identifies feature information. The conversion processing unit 350 sequentially notifies the abnormality detection processor 370 of the feature information based on the number of frames sequentially received within the detection window with the detection window size from the buses 200a and 200b.

The external communication unit 360 transmits vehicle identification information held by the vehicle identification information storage 361 to the server 400 via the network 40, and the external communication unit 360 sends, to the conversion processing unit 350, information indicating the detection window size received, as a response, from the server 400. The external communication unit 360 also notifies (sends the feature information to) the server 400 of the feature information notified from the conversion processing unit 350. Furthermore, the external communication unit 360 provides model information (information representing a criterion model indicating a criterion in terms of an occurrence frequency of data frames) received from the server 400 to the abnormality detection processor 370. The external communication unit 360 notifies (transmits the result of the abnormality detection to) the server 400 of the result of the abnormality detection received from the abnormality detection processor 370.

Figures 10, 11, 12, 13:
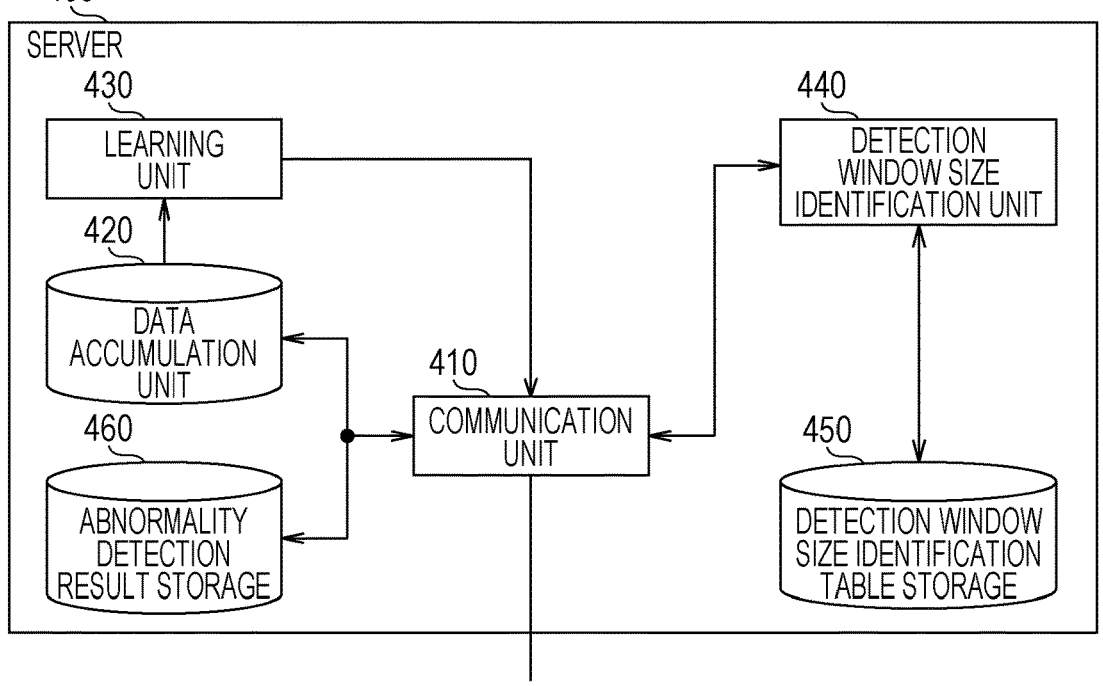
FIG. 10 is a diagram illustrating an example of vehicle identification information held by a gateway according to the first embodiment.
FIG. 11 is a diagram illustrating an example of a transfer rule used by a gateway according to the first embodiment.
FIG. 12 is a diagram illustrating a configuration of a server according to the first embodiment.
FIG. 13 is a diagram illustrating an example of a detection window size identification table stored in a server according to the first embodiment.

The vehicle identification information storage 361 stores vehicle identification information for identifying vehicles. FIG. 10 illustrates an example of vehicle identification information.

The abnormality detection processor 370 acquires, via the external communication unit 360, the model information transmitted from the server 400, and, based on the model information, the abnormality detection processor 370 updates a particular model (a model indicating a criterion in terms of the frequency of occurrence of data frames) stored in the model storage 371. For example, the abnormality detection processor 370 may update the particular model so as to become identical to the criterion model indicated by the model information. The abnormality detection processor 370 also functions as a judger that receives feature information converted by the conversion processing unit 350 based on a value of the ID field notified from the frame interpreter 320, performs an operation process using the feature information and the particular model stored in the model storage 371, and performs the judgment as to whether the state is abnormal or not based on a result of the operation process. That is, the abnormality detection processor 370 judges whether the feature information associated with the set of frames received from the bus satisfies the criterion indicated by the particular model by performing the operation process using the feature information and the particular model. In this judgment, when the number of data frames received in the detection window size reflected in feature information, counted individually for each ID, is consistent with the criterion (for example, a criterion in terms of the frequency of occurrence of data frames in the normal state) indicated by the particular model, it is judged that the state is normal. However, when the criterion is not satisfied (that is, when the number is deviated from the criterion), it is judged that the state is abnormal. The operation process is defined to achieve the judgment in the above-described manner. The operation process is, for example, a combination of one or more processes including a comparison, an arithmetic operation, a logical operation, a conditional judgment, and the like between the particular model and the feature information. The abnormality detection processor 370 sends a result of the judgment made by the operation process as to whether the state is abnormal or not (that is, an abnormality detection result) to the external communication unit 360.

The model storage 371 stores the particular model notified from the abnormality detection processor 370.

The transfer processor 380 determines the bus to be used in transferring (the transfer destination bus) according to the transfer rule stored in the transfer rule storage 381 depending on the ID of the received frame (the message ID), and the transfer processor 380 sends bus information indicating the bus to be used in the transfer, the message ID notified from the frame interpreter 320, and data to the frame generator 390.

The transfer rule storage 381 stores the transfer rule that is information indicating the rule of transferring frames for each bus. FIG. 11 illustrates an example of a transfer rule.

The frame generator 390 configures an error frame according to an instruction indicated, in a notification received from the frame interpreter 320, that an error frame is to be transmitted, and the frame generator 390 sends the error frame to the frame transmission/reception unit 310 thereby controlling the frame transmission/reception unit 310 to transmit the error frame. The frame generator 390 also configures a frame using data and a message ID notified from the transfer processor 380, and sends the resultant frame and bus information to the frame transmission/reception unit 310.

1.10 Vehicle Identification Information

FIG. 10 illustrates an example of vehicle identification information held by a gateway 300. The vehicle identification information is information for identifying the vehicle. FIG. 10 illustrates an example of vehicle identification information indicating a car maker (vehicle manufacturer), a vehicle type, and a chassis number. In this example, for example, the chassis number is information (information identifying each vehicle) that distinguishes each vehicle from the other vehicles, and the chassis number includes a model (vehicle model) and a serial number. Note that vehicles that are the same in type have the same configuration of the on-board network, and have the same specifications in terms of the use of data frames (messages) (the specifications of the content of the data field for each message ID) transmitted over the CAN bus of the on-board network. For example, vehicles that are the same in type are the same in vehicle model. The vehicle identification information is not limited to this example, but the vehicle identification information may be, for example, vehicle identification number (VIN) or the like. For example, when vehicles have the same values from the beginning to a digit before the serial number in the vehicle identification number, these vehicles are the same in vehicle type. Note that the vehicle identification information does not necessarily need to be information that uniquely identifies a vehicle. For example, the vehicle identification information may be information indicating only the type of the vehicle, information indicating only the manufacturer of the vehicle, information indicating only the chassis number, or information which is a combination of one or more of pieces of information described above and another information.

1.11 Transfer Rule

FIG. 11 illustrates an example of a transfer rule stored in the transfer rule storage 381 of the gateway 300.

The transfer rule indicates a correspondence between a transfer source bus and a transfer destination bus and an ID of a frame to be transferred (a message ID). In FIG. 11, "*" indicates that frame transfer is performed regardless of the message ID. In the example illustrated in FIG. 11, the rule is set such that a frame received from the bus 200a is transferred to the bus 200b regardless of the message ID. Furthermore, in this example, the rule is also set such that, of frames received from the bus 200b, only frames having a message ID of "3" are transferred to the bus 200a.

1.12 Configuration of Server 400

The server 400 is a computer located outside the vehicle and capable of, for example, managing a plurality of vehicles. The server 400 includes a storage medium such as a memory, a hard disk, or the like, a processor, a communication circuit, and the like.

FIG. 12 is a diagram illustrating a configuration of the server 400. The server 400 includes, as illustrated in FIG. 12, a communicator 410, a data accumulation unit 420, a learner 430, a detection window size identification unit 440, a detection window size identification table storage 450, and an abnormality detection result storage 460. Each of these constituent elements is realized by a communication circuit in the server 400, a processor or the like that executes a control program stored in a memory, or the like.

The communicator 410 communicates with the gateway 300 of each vehicle via the network 40. Furthermore, the communicator 410 sequentially receives, from the gateway 300, feature information in which the counts per the detection window size for the respective IDs are reflected, and the communicator 410 accumulates the received feature information in the data accumulation unit 420 separately for the respective vehicles. Furthermore, the communicator 410 notifies (transmits model information to) the gateway 300 of model information indicating the criterion model notified from the learner 430. Furthermore, the communicator 410 notifies the detection window size identification unit 440 of the vehicle identification information notified from the gateway 300, and notifies (transmits information indicating the detection window size to) the gateway 300 of the detection window size notified from the detection window size identification unit 440. Furthermore, the communicator 410 controls the abnormality detection result storage 460 to store an abnormality detection result notified from the gateway 300.

The data accumulation unit 420 accumulates (stores) the feature information notified from the communicator 410 distinctively for each vehicle.

The learner 430 constructs the criterion model (the model indicating the criterion in terms of the frequency of occurrence of data frames appearing on a bus of an on-board network of a vehicle) for each vehicle based on the feature information associated with vehicle accumulated in the data accumulation unit 420, and the learner 430 stores the constructed criterion model. The learner 430 updates the criterion model, as required, based on the feature information. For example, the learner 430 sequentially updates the stored criterion models, for example, via machine learning based on feature information sequentially collected by the communicator 410 and the data accumulation unit 420.

The detection window size identification unit 440 refers to a detection window size identification table stored in the detection window size identification table storage 450, and identifies a detection window size depending on vehicle identification information notified from the communicator 410, and the detection window size identification unit 440 notifies the communicator 410 of information indicating the identified detection window size.

The detection window size identification table storage 450 stores the detection window size identification table used in identifying the detection window size depending on the vehicle identification information. FIG. 13 illustrates an example of a detection window size identification table.

The abnormality detection result storage 460 stores, as a log for each vehicle, the abnormality detection result notified from the communicator 410. Note that in a case where the server 400 manages a plurality of vehicles, for example, the information from each vehicle may be classified by the server 400 based on the vehicle identification information received from the vehicle, while the gateway 300 of the vehicle may, for example, attach all or part of the vehicle identification information to the feature information or the abnormality detection result transmitted by the gateway 300 to the server 400.

1.13 Detection Window Size Identification Table

FIG. 13 illustrates an example of a detection window size identification table stored in the server 400. The detection window size identification table illustrated in FIG. 13 is a table representing a correspondence between vehicle identification information and a detection window size. The vehicle identification information in the detection window size identification table illustrated by way of example in FIG. 13 includes, as in the example illustrated in FIG. 10, a car maker, a vehicle type, and a chassis number. The detection window size may be determined, for example, such that the detection window size is equal to a transmission period of a type of data frame whose transmission period is the shortest of a plurality of types of data frames (that is, a plurality of data frames with message IDs different from each other) to be transmitted in a normal state over a CAN bus in the on-board network system of each vehicle in a set of vehicles identified by the vehicle identification information. To determine the detection window size, information may be referred to as to specifications of the on-board network system or a result of analysis of current situations, in terms of normal state, of the on-board network system. For example, in a case where the vehicle identification information identifies not individual vehicles but only the vehicle type, the detection window size may be determined so as to be equal to the shortest one of the transmission periods of frames of a plurality of IDs to be transmitted in a normal state in the on-board network system of each vehicle of the type of interest. The detection window size in the detection window size identification table may be determined in other ways. In any case, it is useful to determine the detection window size such that it is possible to properly distinguish, by the abnormality detection apparatus (the gateway 300) of a vehicle, between a normal state and a state in which an attack occurs.

1.14 Frame Transmission Process by ECU 100a

Figure 14:
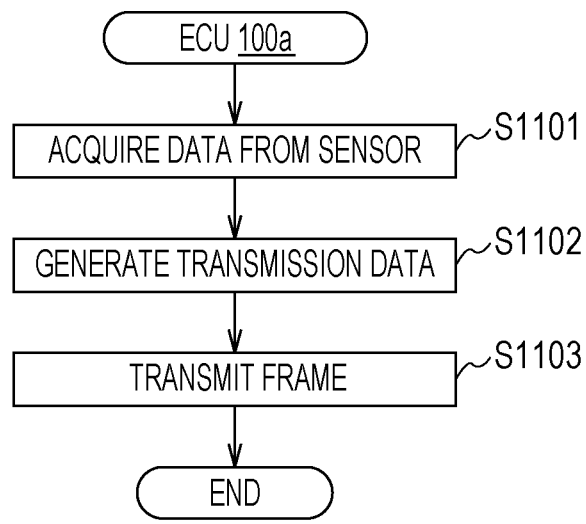
FIG. 14 is a diagram illustrating an example of a frame transmission process sequence performed in an ECU.

FIG. 14 illustrates an example of a frame transmission process sequence performed by the ECU 100a. Referring to FIG. 14, the frame transmission process by the ECU 100a is described below.

The ECU 100a acquires, by the data acquisition unit 160, data from a sensor (in terms of, for example, a vehicle speed obtained by measuring, for example, a parameter of the engine 101 by the sensor) (step S1101).

Next, based on the data acquired from the sensor, the ECU 100a generates, by the frame generator 170, a frame (a data frame) to be transmitted (step S1102).

Next, the ECU 100a transmits (broadcasts) the generated frame to the bus 200a (step S1103). The process from step S1101 to step S1103 is generally repeated periodically at fixed intervals.

Also in the ECUs 100b to 100d, the frame transmission process may be performed according to a procedure similar to that by the ECU 100a. However, the transmission repetition period may be different between the respective ECUs.

1.15 Frame Transfer Process by Gateway 300

Figure 15:
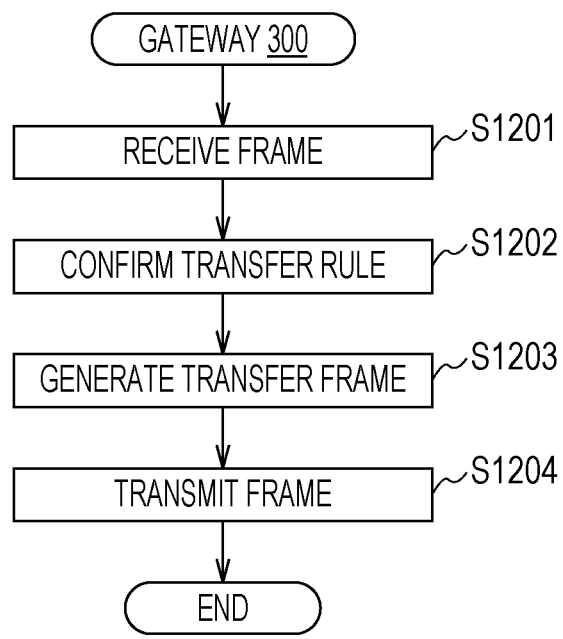
FIG. 15 is a diagram illustrating an example of a frame transfer process sequence performed in a gateway according to the first embodiment.

FIG. 15 illustrates an example of a frame transfer process sequence performed in the gateway 300. Referring to FIG. 15, the frame transfer process by the gateway 300 is described below. The gateway 300 performs the frame transfer process each time a frame (a data frame) is received from either one of the bus 200a and the bus 200b. In the following description, it is assumed by way of example that the gateway 300 transfers a frame received from the bus 200a to the bus 200b.

The gateway 300 receives a frame transmitted (broadcast) to the bus 200a (step S1201).

Next, the gateway 300 confirms the transfer rule (see FIG. 11) (step S1202).

In a case where the judgment by the gateway 300 based on the transfer rule is that the received frame is a frame to be transferred, the gateway 300 generates a frame to be transferred based on the content of the received frame (step S1203).

Next, the gateway 300 transmits (broadcasts) the frame to be transferred to the bus 200b, and ends the frame transfer process (step S1204). On the other hand, in a case where the judgment based on the transfer rule confirmed in step S1202 is that the received frame is not a frame to be transferred, the gateway 300 ends the frame transfer process without transferring the frame.

1.16 Detection Window Size Determination Sequence

Figure 16:
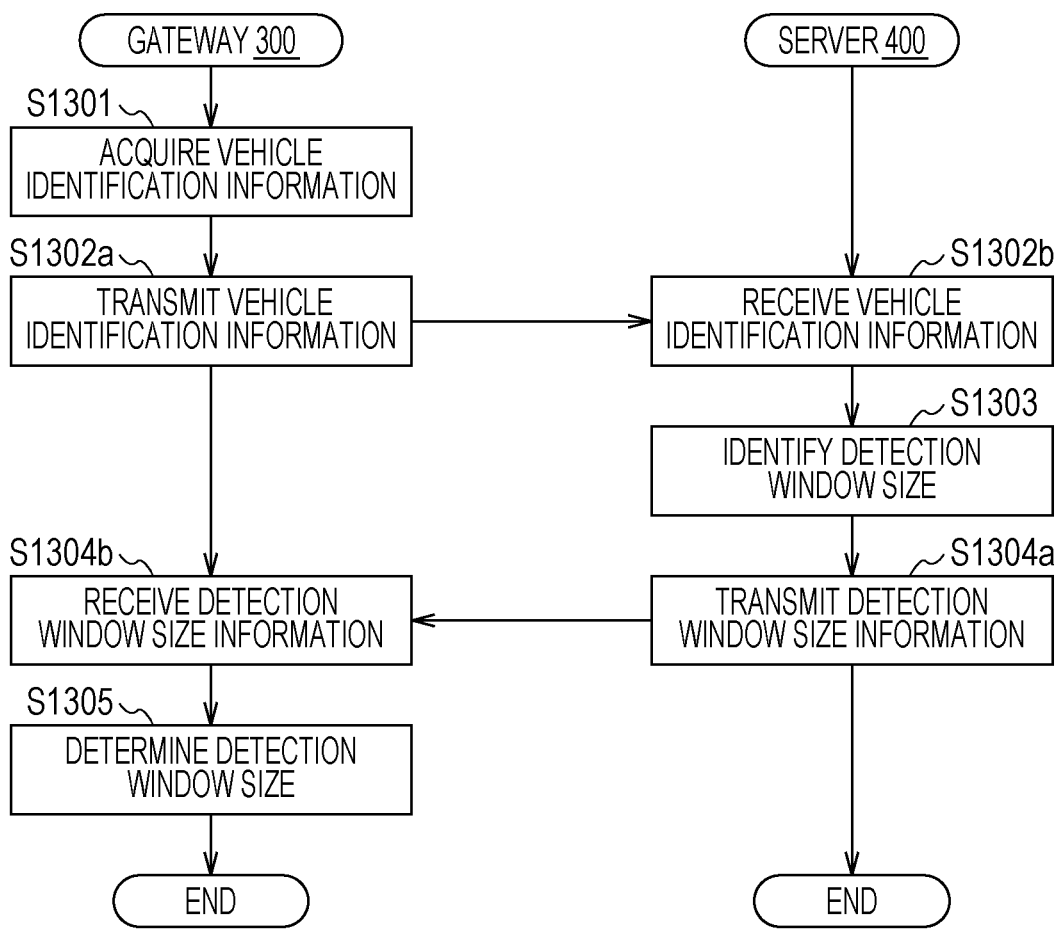
FIG. 16 is a diagram illustrating an example of a detection window size determination sequence performed in a gateway and a server according to the first embodiment.

FIG. 16 illustrates an example of a detection window size determination sequence performed, in cooperation, by the gateway 300 and the server 400. Referring to FIG. 16, the detection window size determination sequence is described below.

The gateway 300 acquires vehicle identification information (step S1301). The acquisition of the vehicle identification information by the gateway 300 is from the vehicle identification information storage 361. The vehicle identification information storage 361 may store the vehicle identification information, for example, when the gateway 300 is installed in the vehicle (for example, when the vehicle is produced), or the gateway 300 may receive vehicle identification information of an ECU from this ECU in a vehicle including prestored vehicle identification information and the vehicle identification information storage 361 may store the received vehicle identification information.

The gateway 300 transmits the vehicle identification information acquired in step S1301 to the server 400 (step S1302a). Thus, the server 400 receives the vehicle identification information (step S1302b). Note that the transmission of the vehicle identification information from the gateway 300 to the server 400 is performed, for example, when the gateway 300 is installed in the vehicle (for example, when the vehicle is produced). The transmission of the vehicle identification information may be performed at another time or may be performed at one of a plurality of times. An example of one of timings of the transmission (the timing of transmitting the vehicle identification information by the gateway 300 to the server 400) is each time the vehicle is used such as driving of the vehicle is started (for example, each time the engine of the vehicle is started or each time an accessory is turned on (ACC-ON), or the like), each time a particular time elapses (for example, one every day), or the like. In synchronization with the timing of transmitting the vehicle identification information from the gateway 300 to the server 400, the whole of the detection window size determination sequence illustrated in FIG. 16 may be executed.

In the server 400, the detection window size identification unit 440 identifies the detection window size according to the vehicle identification information received in step S1302b (step S1303), and the detection window size identification unit 440 transmits, as a response to the vehicle identification information, information (detection window size information) indicating the identified detection window size to the gateway 300 (step S1304a). Thus, the gateway 300 receives the detection window size information (step S1304b).

In the gateway 300, the conversion processing unit 350 determines the detection window size according to the received detection window size information, and stores the detection window size (step S1305).

1.17 Learning Process Sequence

Figure 17:
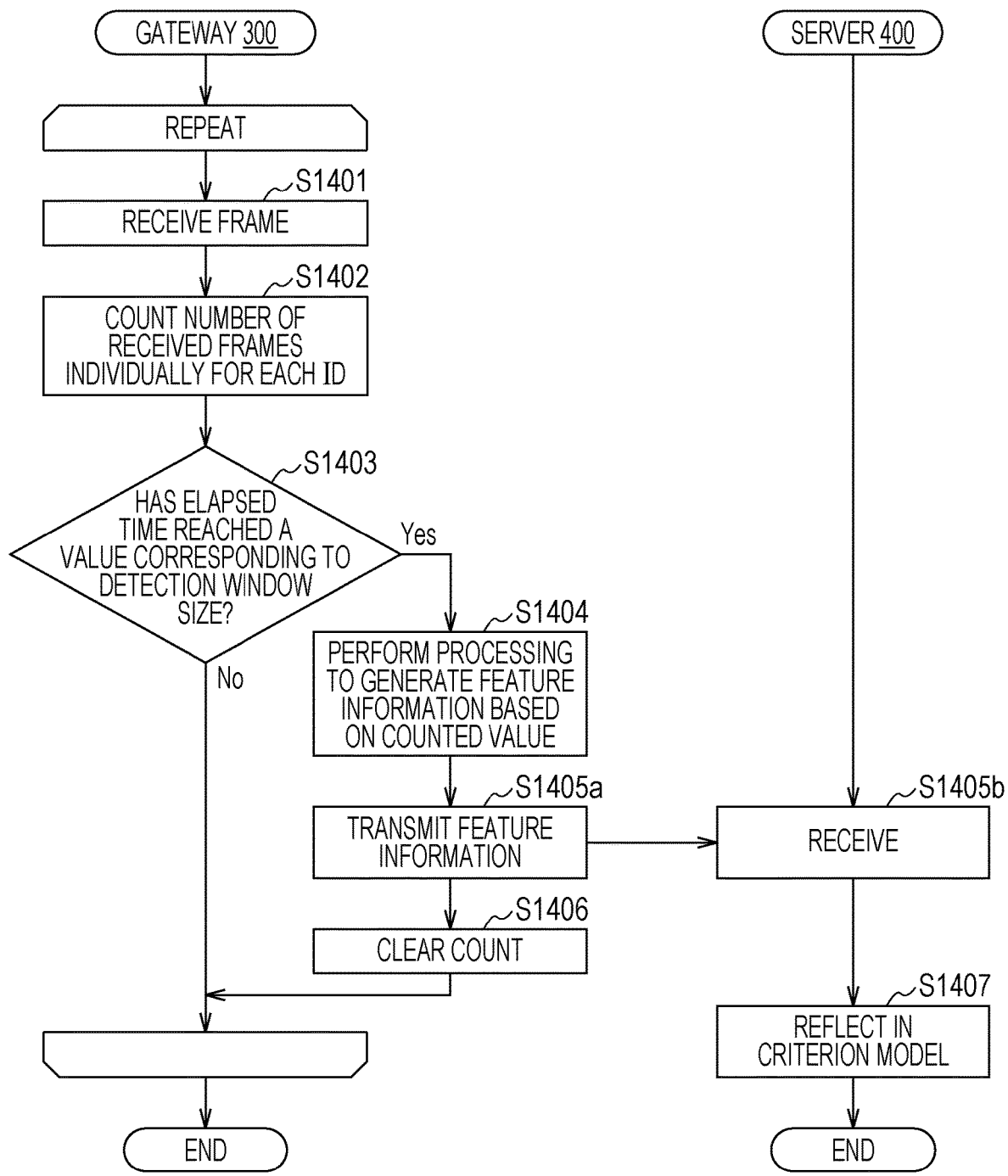
FIG. 17 is a diagram illustrating an example of a learning process sequence performed in a gateway and a server according to the first embodiment.

FIG. 17 illustrates an example of a learning process sequence performed, in cooperation, by the gateway 300 and the server 400. In the learning process sequence, feature information obtained as a result of performing the conversion process on a set of frames received by the gateway 300 in the on-board network of the vehicle is transmitted to the server 400, and the server 400 modifies the criterion model such that the feature information is reflected in the criterion model. Referring to FIG. 17, the learning process sequence is described below.

When the gateway 300 receives a frame (a data frame) from the bus 200a or the bus 200b in each detection window with a time length corresponding to the detection window size stored in the conversion processing unit 350 (step S1401), the gateway 300 increments the count of frames received within the detection window for corresponding one of the IDs (message IDs) (step S1402).

The conversion processing unit 350 judges an elapsed time corresponding to the detection window size (that is, an arrival of an end of one detection window) (step S1403). When an end of a detection window comes, the conversion processing unit 350 performs a conversion process based on the number of received frames (the number of counts) for each ID thereby generating feature information (step S1404). Subsequently, the gateway 300 transmits the feature information generated by the conversion processing unit 350 to the server 400 (step S1405a), and the conversion processing unit 350 clears the number of counts (step S1406). Thereafter, the gateway 300 returns to the process of detecting a next detection window (that is, the gateway 300 returns to the process in step S1401). Note that in a case where it is determined in step S1403 that an end of a detection window has not yet come, the gateway 300 returns to the process in step S1401.

In response to transmission of the feature information in step S1405a by the gateway 300, the server 400 receives the feature information (step S1405b), and the learner 430 modifies the criterion model such that the received feature information is reflected in the criterion model (step S1407). Each time feature information is received, the server 400 may modify the criterion model such that the feature information is reflected in the criterion model, or a plurality of pieces of received feature information may be accumulated in the data accumulation unit 420, and the learner 430 may update the criterion model such that the plurality of pieces of feature information are reflected at a time in the criterion model. In this learning process sequence, the criterion model is updated such that the feature information associated with a frame received in a normal state in the on-board network of the vehicle is reflected in the criterion model thereby allowing the criterion model to be used as the criterion in terms of the frequency of occurrence of frames appearing on the bus of the on-board network of the vehicle. The criterion model is defined, for example, individually for each piece of vehicle identification information acquired from vehicles. The criterion model may be defined, for example, for each vehicle. However, the same criterion model may be shared by vehicles of the same vehicle type. That is, there is a criterion model corresponding to a vehicle to which information indicating a detection window size is transmitted by the server 400 depending on the vehicle identification information from the vehicle, and model information indicating this criterion model is transmitted to the vehicle in a model update process sequence described later. The modification of the criterion model such that the feature information is reflected in the criterion model may be performed, for example, by updating the criterion model via machine learning using the feature information.

Figure 18:
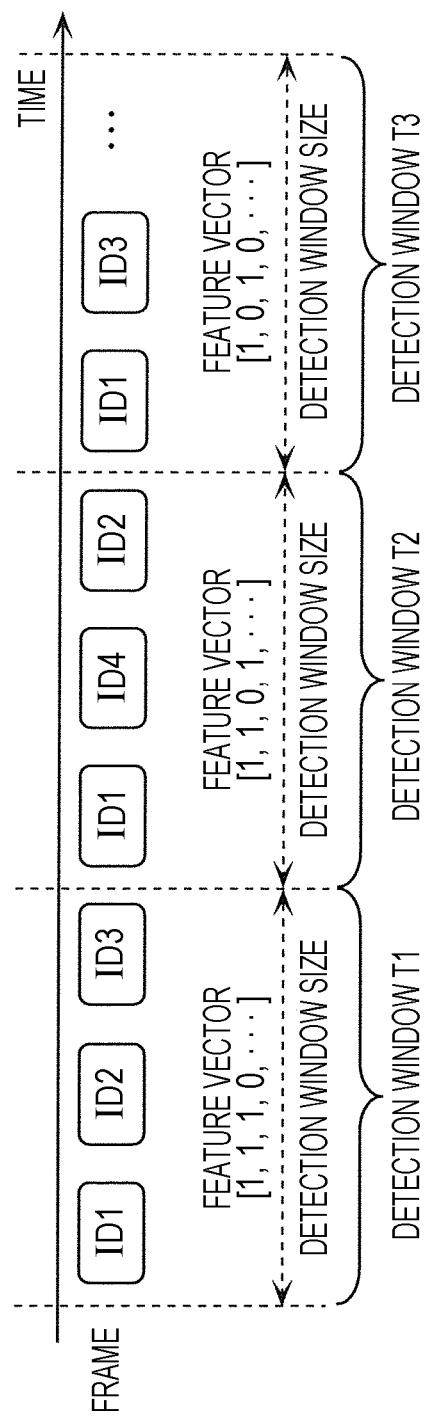
FIG. 18 is a diagram for illustrating a detection window used by a gateway according to the first embodiment.

Referring to FIG. 18, an example of a detection window with a time length corresponding to the detection window size used in the learning process sequence and an example of feature information generated by the conversion process are described below.

In the conversion processing unit 350 of the gateway 300, feature information based on the number of frames received in the detection window from the bus is identified for each of periods (for each of detection windows T1, T2, and T3) each having a time length corresponding to the detection window size. In FIG. 18, by way of example, a feature vector whose components indicate the numbers of received frames counted for the respective IDs is identified as feature information. In FIG. 18, a frame with an ID of 1 is denoted by ID1, a frame with an ID of 2 is denoted by ID2, and so on. The feature vector is a vector whose components respectively indicate, for example, the number of frames (the counts) of ID1 received in the detection window, the number of frames of ID2 received in the detection window, the number of frames of ID3 received in the detection window, and the number of frames of ID4 received in the detection window. The number of components of the vector is equal to, for example, the total number of all message IDs that appear on the bus. In the example of the feature vector illustrated in FIG. 18, components respectively indicating the numbers of frames of ID1, ID2, ID3, and ID4 are arranged in this order. In a detection window T1, the number of received frames is 1 for each of ID1, ID2, and ID3, while the number of received frames is 0 for ID4, and thus the feature vector in the detection window T1 is given as [1, 1, 1, 0, . . . ]. On the other hand, in a detection window T2, the number of received frames is 1 for each of ID1, ID2, and ID4, while the number of received frames is 0 for ID3, and thus the feature vector in the detection window T2 is given as [1, 1, 0, 1, . . . ]. In a detection window T3, the number of received frames is 1 for each of ID1 and ID3, while the number of received frames is 0 for each of ID2 and ID4, and thus the feature vector in the detection window T3 is given as [1, 0, 1, 0, . . . ]. The gateway 300 and the server 400 may cooperate in an arbitrary manner in performing the process (the conversion process and the like) to modify the criterion model of the server 400 such that the number of frames received by the gateway 300 within the period with the detection window size as counted individually for the respective IDs. In the conversion process, principal component analysis or the like may be used to reduce the dimension (the number of components) of the feature vector serving as the feature information.

In the server 400, when the criterion model is updated so as to reflect the feature information, for example, a conversion may be performed to make it possible to efficiently detect an abnormality in the gateway 300 by using a particular model similar to the criterion model. For example, the server 400 may perform a conversion such that a set of feature vectors with reduced dimension serving as the feature information sequentially acquired from the gateway 300 has a data structure such as a k-dimensional tree or the like that is suitable for calculating a nearest neighbor distance.

1.18 Model Update Process Sequence

Figure 19:
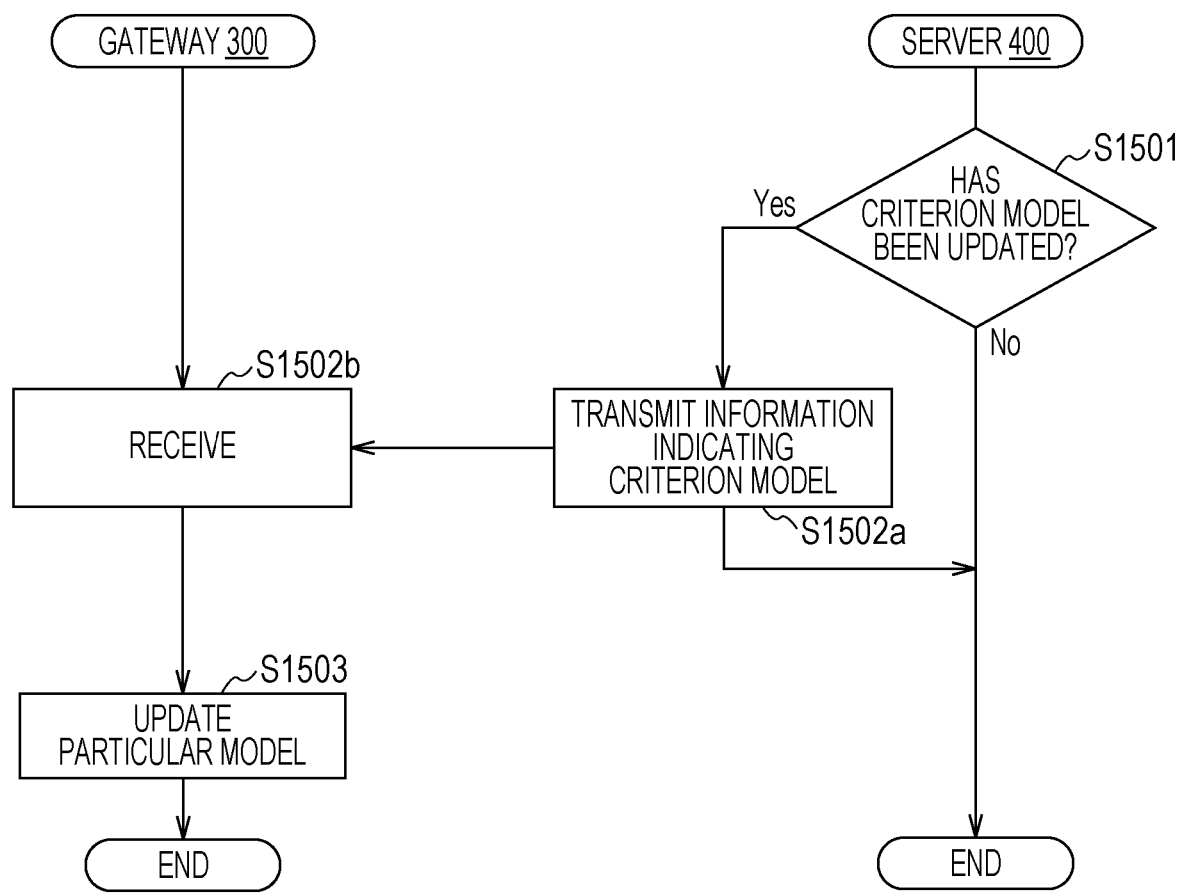
FIG. 19 is a diagram illustrating an example of a model update process sequence performed in a gateway and a server according to the first embodiment.

FIG. 19 illustrates an example of a model update process sequence performed, in cooperation, by the gateway 300 and the server 400. In the model update process sequence, the criterion model updated in the server 400 is reflected in the particular model stored in the gateway 300 of the vehicle. Referring to FIG. 19, the model update process sequence is described below. The model update process sequence is executed at an arbitrary time (for example, once every day).

The server 400 judges whether the criterion model has been updated as a result of the learning process sequence (whether a change in the content of the criterion model has occurred) (step S1501). In a case where the criterion model has been updated, the server 400 transmits model information indicating the updated criterion model to the gateway 300 (step S1502a). In response, the gateway 300 receives the model information indicating the criterion model (step S1502b).

Upon receiving the model information, the abnormality detection processor 370 in the gateway 300 updates the particular model stored in the model storage 371 according to the model information (step S1503). As a result, the particular model becomes identical, for example, to the criterion model in the server 400.

1.19 Abnormality Detection Process Sequence

Figure 20:
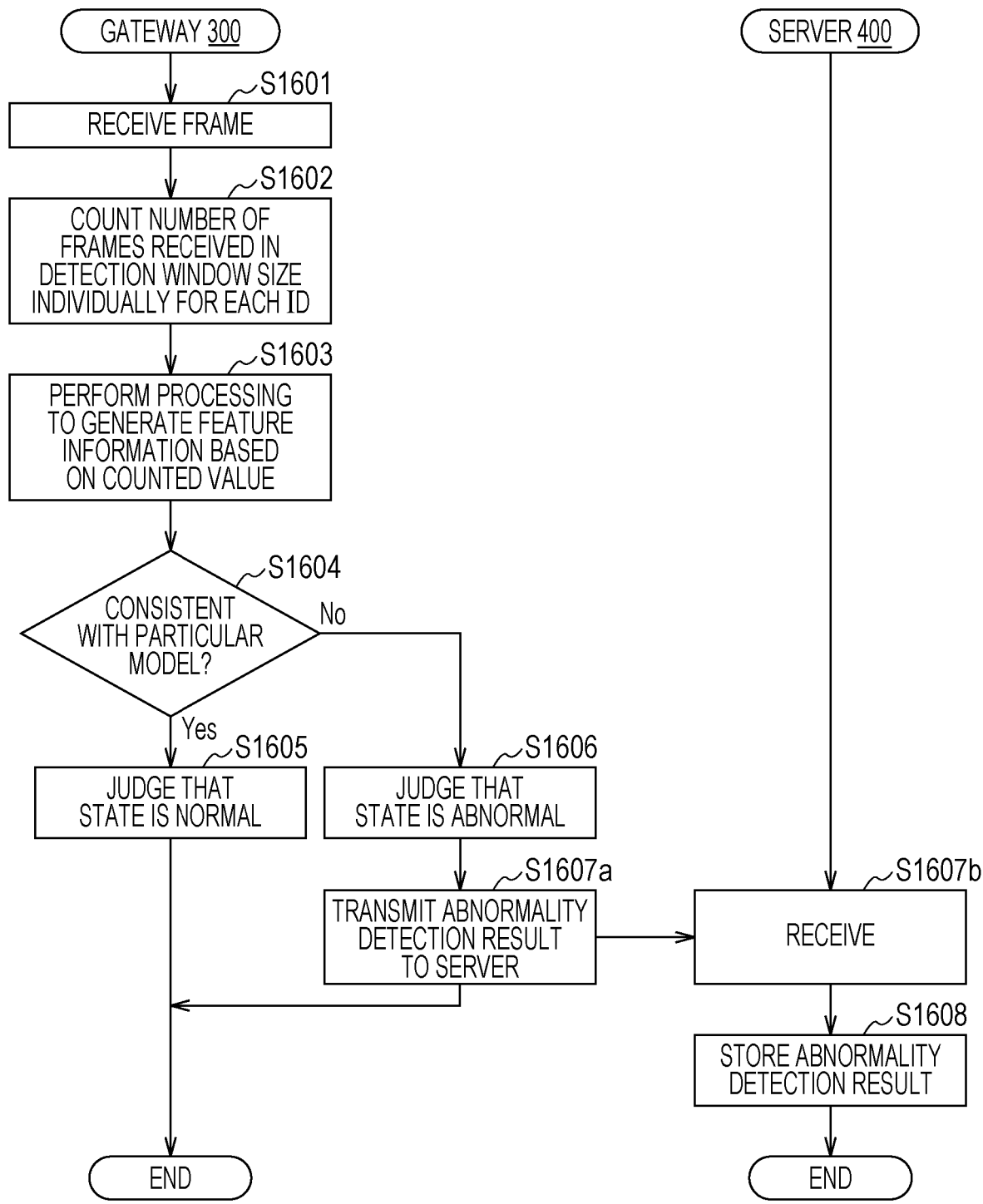
FIG. 20 is a diagram illustrating an example of an abnormality detection process sequence performed in a gateway and a server according to the first embodiment.

FIG. 20 illustrates an example of an abnormality detection process sequence performed, in cooperation, by the gateway 300 and the server 400. The abnormality detection process sequence is executed, for example, at a stage where the vehicle is used. The abnormality detection process sequence includes a process in which the gateway 300 monitors frames transmitted on the buss 200a and 200b of the on-board network of the vehicle and detects an abnormality by making a judgment using the particular model as to whether the state is abnormal. Via the model update process sequence described above, the particular model becomes identical to the criterion model updated in the learning process sequence described above. Note that the learning process sequence described above may be performed before the abnormality detection process sequence (for example, before the vehicle is used, and more particularly, when the vehicle is produced or subjected to testing or the like). Alternatively, the learning process sequence may be performed in parallel to the abnormality detection process sequence when the vehicle is used. Referring to FIG. 20, the abnormality detection process sequence is described below.

In the gateway 300, when a frame is received, (step S1601), the conversion processing unit 350 counts the number of frames received in a detection window with a detection window size for each ID (step S1602), and the conversion processing unit 350 performs the conversion process to generate, for example, a feature vector serving as feature information (step S1603). The process from step S1601 to step S1602 is performed repeatedly in each detection window. At the end of each detection window, step S1603 is performed to generate feature information, and the counter that counts the number of received frames for each ID is cleared.

Next, in the gateway 300, the abnormality detection processor 370 receives feature information generated by the conversion processing unit 350 and judges whether the feature information is consistent or inconsistent with the criterion indicated by the particular model stored in the model storage 371 (step S1604). That is, the abnormality detection processor 370 performs an operation process using the feature information and the particular model, and makes a judgment based on a result of the operation process as to whether the feature information is inconsistent with the criterion indicated by the feature information (that is, whether there is an abnormality). An example of the operation process is to calculate the nearest neighbor distance of the feature vector (see FIG. 18) serving as the feature information received from the conversion processing unit 350 to the criterion (for example, the distribution of the feature vector in the normal state) indicated by the particular model represented in a data structure such as a k-dimensional tree or the like, and compare the calculated nearest neighbor distance with a threshold value. For example, when the nearest neighbor distance distributes according to the normal distribution, if the nearest neighbor distance is out of a range defined by a threshold value, for example a range of a standard deviation times a particular value (for example, 3) from the average defined by a threshold value, then it is judged that there is an abnormality.

In a case where it is determined in step S1604 that the feature information is not inconsistent with the criterion indicated by the particular model (that is, the feature information is consistent with the criterion), the gateway 300 judges that the state is normal (step S1605), and the gateway 300 does not transmit particular information to the server 400. On the other hand, in a case where it is judged that the feature information is inconsistent with the criterion indicated by the particular model, the gateway 300 judges that the state is abnormal (step S1606), and the gateway 300 transmits an abnormality detection result to the server 400 (step S1607a).

When the server 400 receives the abnormality detection result (step S1607b), the server 400 stores the abnormality detection result as a log (step S1608).

1.20 Effects of First Embodiment

In the abnormality detection system 10 according to the first embodiment, the gateway 300 functioning as the abnormality detection apparatus installed in the vehicle transmits the vehicle identification information for identifying the vehicle to the server 400, and, based on a response returned from the server 400, the gateway 300 determine the detection window size (the unit time within which the number of frames received is counted to detect an abnormality). This makes it possible to make an accurate detection of an abnormality of an on-board network using the detection window size determined properly for each vehicle. Furthermore, in the abnormality detection system 10, to learn the model (the particular model or the criterion model) used in judging (detecting) an abnormality, the conversion process to generate the feature vector of the received frame is performed by the gateway 300 thereby allowing a reduction in the amount of data transmitted between the gateway 300 and the server 400. In the conversion process, it may be allowed to reduce the dimension of the feature vector by principal component analysis or the like, which makes it possible to further reduce the amount of transmission data, and thus, as a result, it becomes possible to reduce the amount of calculation in the abnormal detection based on the model. Furthermore, the server 400 may accumulate data (feature information received from vehicles) and construct the model (updating the criterion model or the like) such that the feature information is reflected in the model thereby making it possible to construct the optimum model without being limited by a limited resource of the gateway 300 installed in the vehicle. Furthermore, the criterion model constructed (updated) by the server 400 is acquired by the gateway 300 and is used to make the judgment (detection) as to an abnormality thereby making it possible to quickly judge whether there is an abnormality in the vehicle (that is, to detect an abnormality). The gateway 300 then notifies the server 400 of the abnormality detection result. The server 400 stores the abnormality detection result as a log, which makes it possible to manage the vehicle. Furthermore, it becomes possible to construct a better criterion model based on the abnormality detection result. Furthermore, for example, in a case where the vehicle identification information indicates the vehicle type, the server 400 may collect feature information from a plurality of vehicles of the same vehicle type and may properly construct the criterion model for this vehicle type such that it becomes possible to distinguish a normal state and a state in which an attack to this type occurs. The server 400 may transmit the model information indicating the criterion model to the gateway 300 of vehicles of this same type thereby making it possible for each vehicle of this type to properly detect an abnormality based on a particular model similar to the criterion model. Furthermore, when an abnormality is detected, it becomes possible to perform various processes to handle the abnormality (such as generating a warm, controlling the running of the vehicle so as to achieve safety, or the like).

Second Embodiment

A description is given below as an embodiment, which is a modification to the on-board network system of the vehicle in the abnormality detection system according to the first embodiment described above.

In the first embodiment, the detection window size is determined by the gateway 300 of the vehicle via the communication with the server 400 located outside the vehicle, and feature information based on the number of frames received in a time period corresponding to the detection window size counted individually for each ID is transmitted to the server 400 to allow it to update, via learning, the criterion model serving as the basis of the particular model used in detecting an abnormality in the on-board network. In contrast, in an example according to the second embodiment described below, a detection window size used in detecting an abnormality is determined independently by an abnormality detection apparatus of an on-board network system of a vehicle (that is, independently of a server located outside the vehicle).

2.1 Configuration of On-Board Network System

Figure 21:
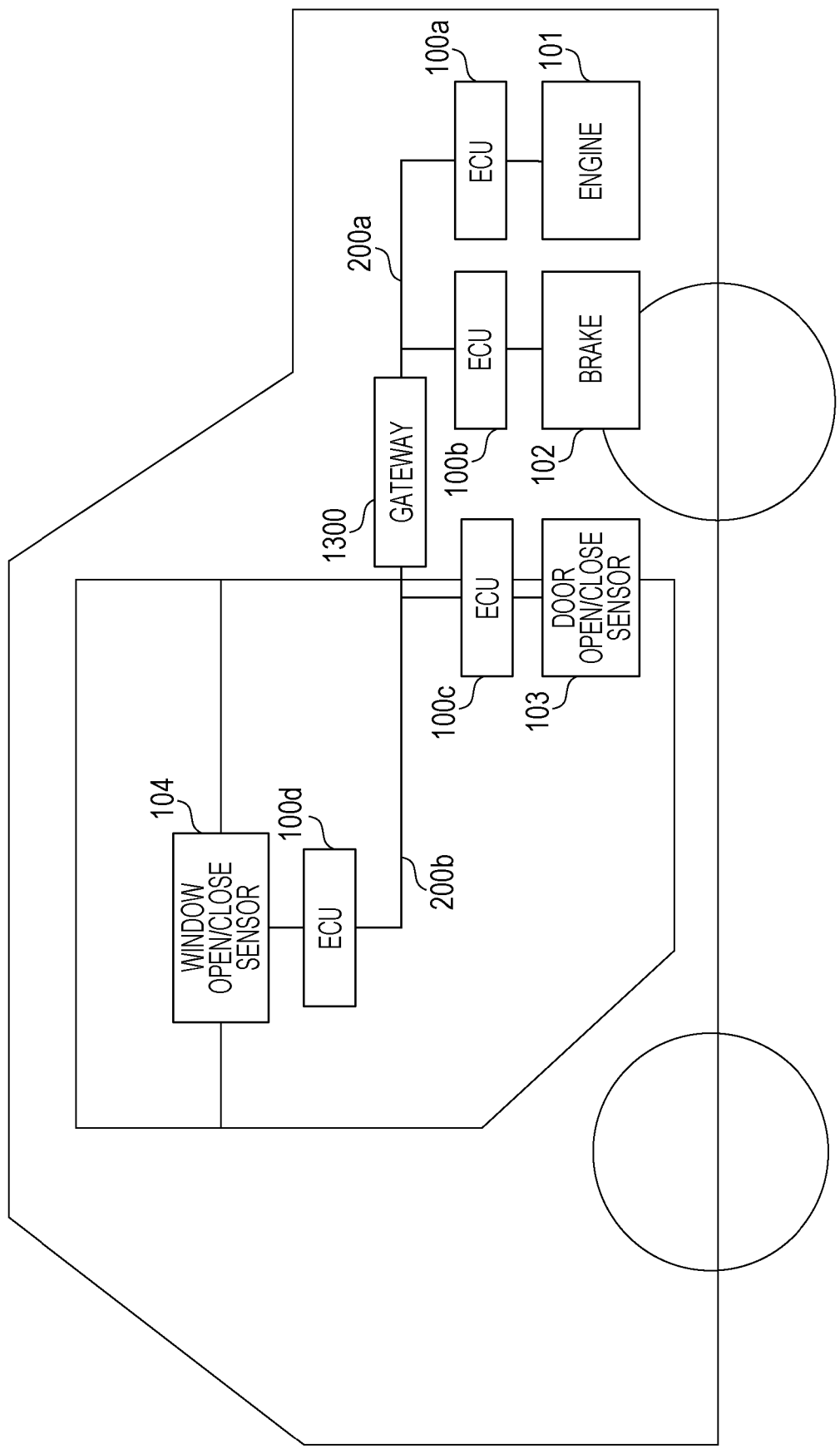
FIG. 21 a diagram illustrating a configuration of an on-board network system in a vehicle according to a second embodiment.

FIG. 21 illustrates a configuration of an on-board network system in a vehicle according to the present embodiment. In FIG. 21, elements similar to those in the first embodiment (see FIG. 1) are referred to by the same symbols as in FIG. 1, and a description thereof is omitted.

The on-board network system of the vehicle illustrated in FIG. 21 includes an ECU 100a, an ECU 100b, an ECU 100c, an ECU 100d, buss 200a and 200b, and a gateway 1300 (example of an abnormality detection apparatus). Each ECU is capable of transmitting and receiving frames via the bus 200a or 200b of the vehicle according to the CAN protocol.

The gateway 1300 is an abnormality detection apparatus obtained by partially modifying the gateway 300 according to the first embodiment described above, and elements which are not described below are similar to those of the gateway 300.

The gateway 1300 is connected to buses 200a and 200b, and has a function of transferring a frame received from one bus to the other bus, and a function of detecting an abnormality by making a judgment based on the frame received from the bus (for example, by judging whether the current state is an abnormal state in which an attack frame is flowing through the bus). The gateway 1300 also has a function of determining a detection window size for use in the abnormality detection (the judgment as to whether there is an abnormality or not), and a function of updating a particular model for use in the abnormality detection depending on feature information in terms of the number of frames received by the on-board network within the detection window having a time period equal to the detection window size.

2.2 Configuration of Gateway 1300

Figure 22:
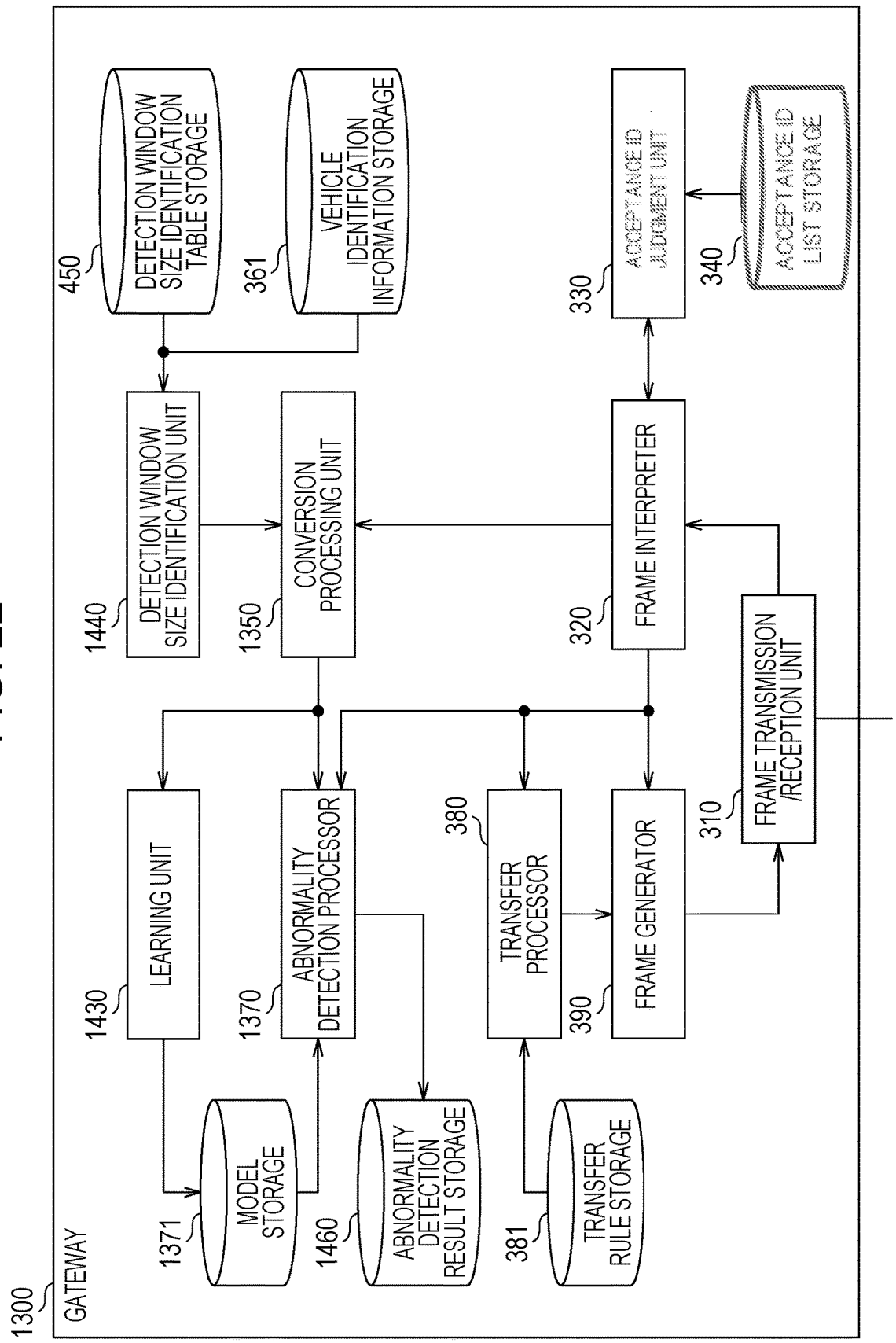
FIG. 22 is a diagram illustrating a configuration of a gateway according to the second embodiment.

FIG. 22 is a diagram illustrating a configuration of the gateway 1300. The gateway 1300 includes a frame transmission/reception unit 310, a frame interpreter 320, an acceptance ID judgment unit 330, an acceptance ID list storage 340, a processing unit 1350, a vehicle identification information storage 361, an abnormality detection processor 1370, a model storage 1371, a transfer processor 380, a transfer rule storage 381, a frame generator 390, a detection window size determination unit 1440, a detection window size identification table storage 450, a learner 1430, and an abnormality detection result storage 1460. Each function of each of these constituent elements is realized, for example, by a communication circuit in the gateway 1300, a processor or a digital circuit that executes a control program stored in a memory, or the like. Note that elements similar to those of the gateway 300 illustrated in FIG. 9 or elements similar to those of the server 400 illustrated in FIG. 12 are denoted in FIG. 22 by the same symbols as those in FIG. 9 or FIG. 12, and a description thereof is omitted.

The detection window size determination unit 1440 functions as a determiner that determines the detection window size. The detection window size determination unit 1440 determines, depending on the vehicle identification information stored in the vehicle identification information storage 361, the detection window size using the detection window size identification table (see FIG. 13) stored in the detection window size identification table storage 450, and notifies the processing unit 1350 of the determined detection window size.

The processing unit 1350 is a processing unit obtained by partially modifying the conversion processing unit 350 according to the first embodiment described above. The processing unit 1350 stores a detection window size notified from the detection window size determination unit 1440, and makes a conversion based on a value of an ID field notified from the frame interpreter 320 such that a set of frames sequentially received from the bus 200a or 200b (a set of values of the ID field sequentially notified) in each detection window with a time length corresponding to the detection window size is converted to feature information indicating the number of frames received in the detection window for each ID (for each message ID) (that is, the count values obtained by counting the frames received in the detection window with the detection window size individually for the respective IDs), and processing unit 1350 periodically sends the feature information to the learner 1430. That is, the processing unit 1350 functions as an identifier that identifies feature information. Furthermore, the processing unit 1350 sequentially sends, to the abnormality detection processor 1370, the feature information of frames based on the number of frames sequentially received from the bus 200a or 200b within the detection window with the detection window size.

The model storage 1371 stores a particular model (a model indicating a criterion in terms of the frequency of occurrence of data frames appearing on a bus of the on-board network of the vehicle).

The learner 1430 constructs the particular model based on the feature information notified from the processing unit 1350, and stores the constructed particular model in the model storage 1371. That is, the learner 1430 updates the particular model stored in the model storage 1371 based on the feature information. The updating of the particular model by the learner 1430 may be performed in a similar manner to the manner of updating the criterion model by the learner 430 according to the first embodiment described above. The learner 1430 may sequentially update the particular model, for example, by machine learning, for example, based on sequentially notified feature information.

The abnormality detection processor 1370 receives the feature information generated by the processing unit 1350 based on the value of the ID field notified from the frame interpreter 320, and the abnormality detection processor 1370 performs an operation process using the received feature information and the particular model stored in the model storage 1371 and makes a judgment based on a result of the operation process as to whether there is an abnormality or not. That is, the abnormality detection processor 1370 functions as a judger that judges, by performing the operation process using the feature information and the particular model, whether the feature information associated with a set of frames received from the bus is consistent with the criterion indicated by the particular model. In this judgment, when the number of data frames received in the detection window size reflected in feature information, counted individually for each ID, is consistent with the criterion (for example, a criterion in terms of the frequency of occurrence of data frames in the normal state) indicated by the particular model, it is judged that the state is normal. However, when the criterion is not satisfied (that is, when the number is deviated from the criterion), it is judged that the state is abnormal. The abnormality detection processor 370 stores a result of the judgment by the operation process as to the abnormality (that is, an abnormality detection result) as a log in the abnormality detection result storage 1460.

2.3 Detection Window Size Determination Sequence

Figure 23:
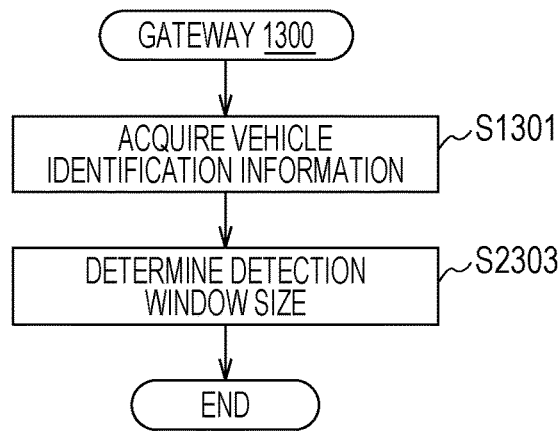
FIG. 23 is a diagram illustrating an example of a detection window size determination sequence performed in a gateway according to the second embodiment.

FIG. 23 illustrates an example of a detection window size determination sequence in the gateway 1300. Referring to FIG. 16, the detection window size determination sequence is described below. The timing of executing the detection window size determination sequence may be, for example, when the gateway 1300 is installed in the vehicle (for example, when the vehicle is produced), or another timing or a plurality of timings may be employed. For example, the detection window size determination sequence may be executed each time the vehicle is used (for example, each time the engine of the vehicle is started or each time an accessory is turned on (ACC-ON), or the like), or each time a particular time elapses (for example, one every day). Note that steps similar to those in FIG. 16 are denoted in FIG. 23 by the same symbols as those in FIG. 16, and a description thereof is omitted.

The gateway 1300 acquires vehicle identification information (step S1301).

Next, the gateway 1300 determines the detection window size using a detection window size identification table (see FIG. 13) according to the vehicle identification information acquired in step S1301 (step S2303). The gateway 1300 stores the determined detection window size such that the detection window size is allowed to be used when the processing unit 1350 performs the conversion process. The gateway 1300 may having a function of communicating with the outside of the vehicle. In this case, the detection window size identification table may be acquired from the outside of the vehicle via communication, or the detection window size identification table may be acquired by reading it from a storage medium or the like.

2.4 Learning Process Sequence

Figure 24:
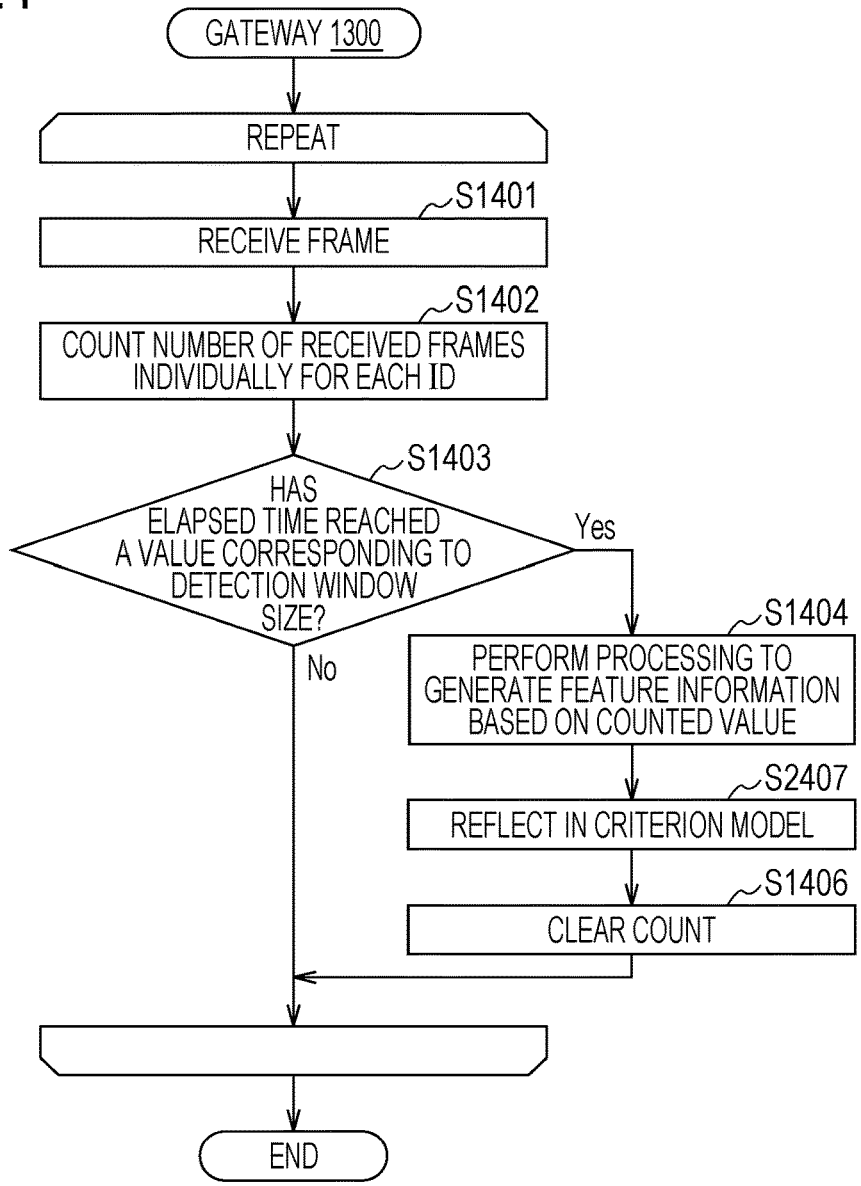
FIG. 24 is a diagram illustrating an example of a learning process sequence performed in a gateway according to the second embodiment.

FIG. 24 illustrates an example of the learning process sequence performed in the gateway 1300. In the learning process sequence, the gateway 1300 updates the particular model stored in the model storage 1371 by performing learning based the feature information obtained by performing the conversion process on a set of frames received from the bus 200a or 200b. Referring to FIG. 24, the learning process sequence is described below. Note that steps similar to those in FIG. 17 are denoted in FIG. 24 by the same symbols as those in FIG. 17, and a description thereof is omitted.

Each time the gateway 1300 receives a frame from the bus 200a or the bus 200b in each detection window with a time length equal to the detection window size (step S1401), the gateway 1300 increments the count of frames received within the detection window for corresponding one of the IDs (step S1402).

When a time corresponding to the detection window size has elapsed (when the end of a detection window comes), the processing unit 1350 generates the feature information by performing the conversion process based on the number (the count) of received frames for each ID (step S1404).

The gateway 1300 modifies the particular model stored in the model storage 1371 such that the feature information generated by the processing unit 1350 is reflected in the particular model (step S2407). It is assumed that the learning process sequence modifies the particular model such that the feature information associated with frames received in the normal state in the on-board network is reflected in the particular model and thus such that the particular model provides a criterion in terms of the frequency of occurrence of frames on the bus of the on-board network. The modifying of the particular model such that the feature information is reflected in the particular model may be accomplished, for example, by updating the particular model via machine learning using the feature information. Note that the processing unit 1350 may employ, as the feature information, a feature vector including components indicate the numbers of frames received within the detection window for the respective message IDs as with the conversion processing unit 350 according to the first embodiment described above. The processing unit 1350 may reduce the dimension of the feature vector by using the principal component analysis or the like in the conversion process. When the particular model is modified such that the feature information is reflected in the particular model, for example, the learner 1430 may perform a conversion process such that it becomes possible to efficiently perform the abnormality detection using the particular model. For example, in the modification of the particular model so as to reflect the feature information, the learner 1430 converts the set of feature vectors so as to have a data structure such as a k-dimensional tree or the like suitable for calculating the nearest neighbor distance.

After the process in step S2407, the gateway 1300 clears the count value (step S1406), and returns to the process in step S1401.

2.5 Abnormality Detection Process Sequence

Figure 25:
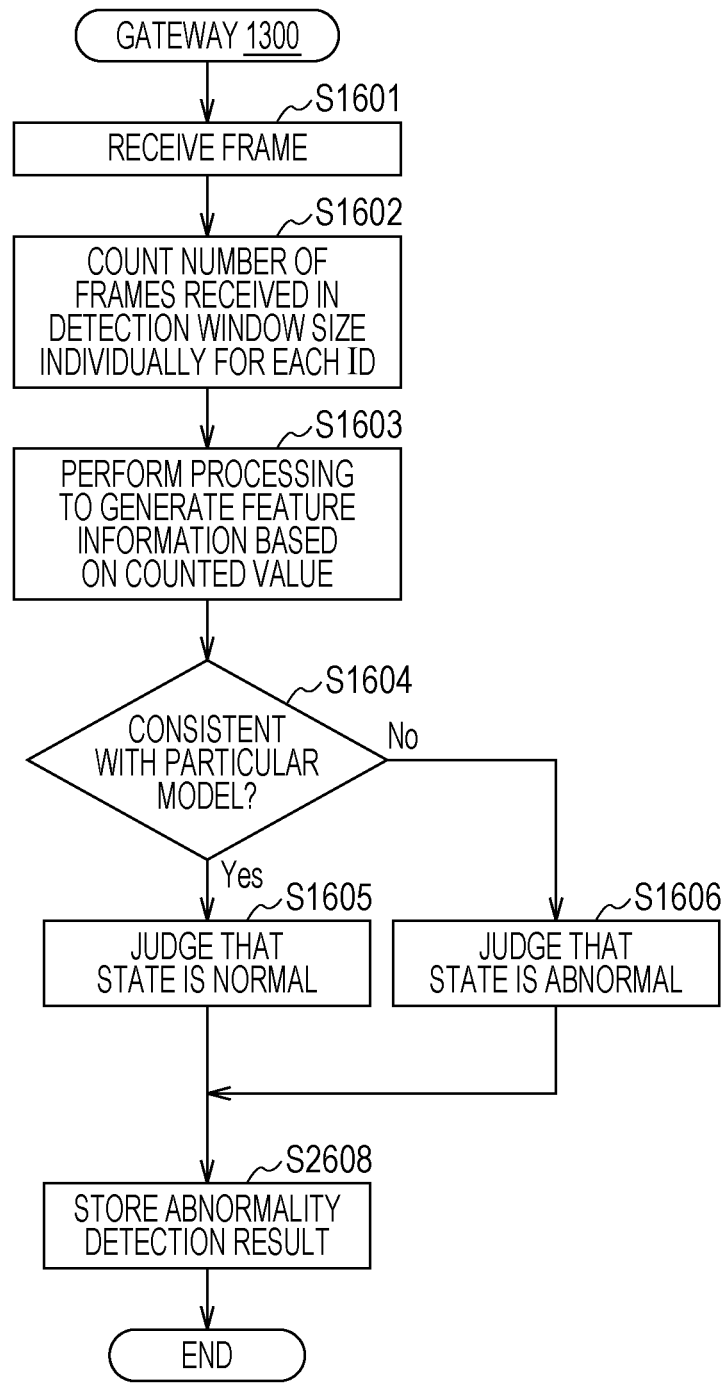
FIG. 25 is a diagram illustrating an example of an abnormality detection process sequence performed in a gateway according to the second embodiment.

FIG. 25 illustrates an example of the abnormality detection process sequence performed in the gateway 1300. The abnormality detection process sequence is executed, for example, at a stage where the vehicle is used. In the abnormality detection process sequence, the gateway 1300 monitors frames transmitted on the buss 200*a* and 200*b* of the on-board network of the vehicle, and detects an abnormality by making a judgment using the particular model as to whether an abnormal state occurs. Note that the learning process sequence described above may be performed before the abnormality detection process sequence (for example, before the vehicle is used, and more particularly, when the vehicle is produced or subjected to testing or the like). Alternatively, the learning process sequence may be performed in parallel to the abnormality detection process sequence when the vehicle is used. Referring to FIG. 25, the abnormality detection process sequence is described below. Note that steps similar to those in FIG. 20 are denoted in FIG. 25 by the same symbols as those in FIG. 20, and a description thereof is omitted.

In the gateway 1300, when a frame is received, (step S1601), the processing unit 1350 counts the number of frames received in a detection window with a detection window size for each ID (step S1602), and the conversion processing unit 1350 performs the conversion process to generate, for example, a feature vector serving as feature information (step S1603). The process from step S1601 to step S1602 is performed repeatedly in each detection window. At the end of each detection window, step S1603 is performed to generate feature information, and the counter that counts the number of received frames for each ID is cleared.

Next, in the gateway 1300, the abnormality detection processor 1370 receives feature information generated by the processing unit 1350 and judges whether the feature information is consistent or inconsistent with a criterion indicated by a particular model stored in the model storage 1371 (step S1604).

In a case where it is determined in step S1604 that the feature information is not inconsistent with the criterion indicated by the particular model (that is, the feature information consistent with the criterion), the gateway 1300 judges that the state is normal (step S1605). On the other hand, in a case where it is judged that the feature information is inconsistent with the criterion indicated by the particular model, the gateway 1300 judges that the state is abnormal (step S1606), and the gateway 1300 stores a judgment result as a log (step S2608). Note that the gateway 1300 may use this judgment result in machine learning (for example, supervised learning) or the like thereby updating the particular model.

2.6 Effects of Second Embodiment

The abnormality detection apparatus (the gateway 1300) according to the second embodiment is capable of determining, without communicating with a server or the like, the detection window size (the unit time in which the number of received frames is counted to detect an abnormality) such that vehicle identification information for identifying the vehicle in which the abnormality detection apparatus is installed is acquired and the detection window size is determined depending on the acquired vehicle identification information. This makes it possible for the gateway 1300 to accurately detect an abnormality in the on-board network by using the detection window size suitable for the vehicle in which the gateway 1300 is installed. That is, it becomes possible for the gateway 1300 to construct a particular model (update the particular model or the like) such that the feature information generated based on monitoring of the on-board network is reflected in the particular model, and make a judgment (detection) on the abnormality using the particular model, which makes it possible to quickly judge whether the state is abnormal in the vehicle (that is, to detect an abnormality). Furthermore, the gateway 1300 is capable of storing, as a log, a result of the judgment as to the abnormality such that the judgment result is used.

OTHER MODIFICATIONS

The first and second embodiments have been described above as examples of the technique according to the present disclosure. For example, modifications described below also fall in the scope of aspects of the present disclosure. For example, modifications described below also fall in the scope of aspects of the present disclosure.

Figure 26:
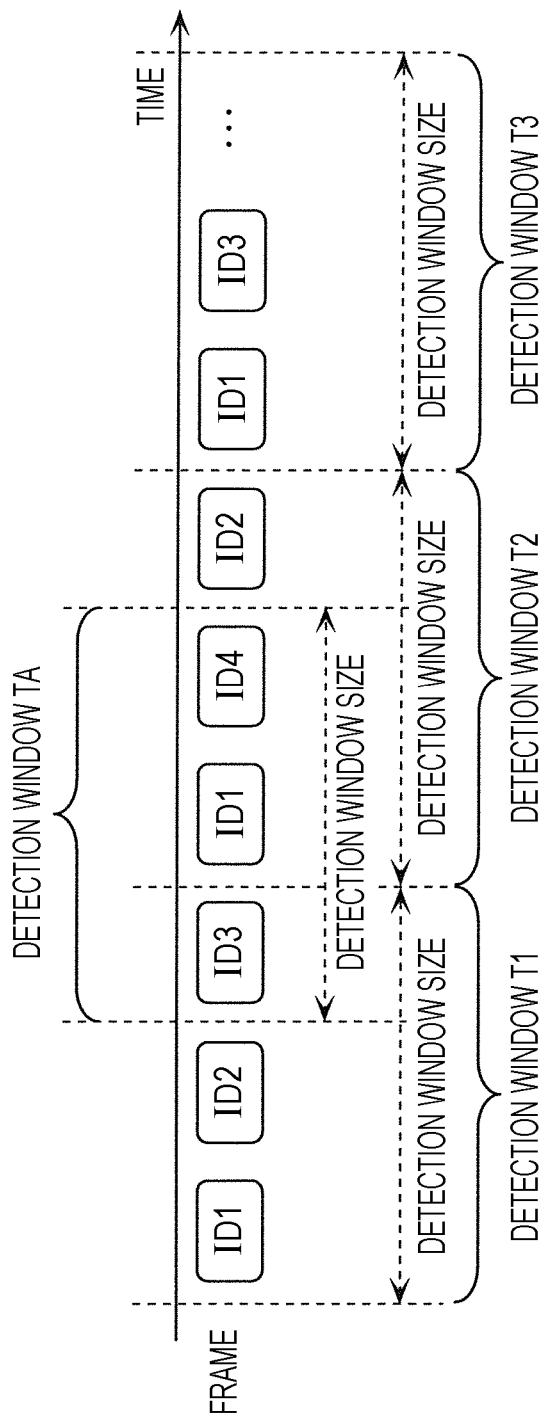
FIG. 26 is a diagram illustrating an example of a detection window according to a modification of an embodiment.

(1) In the embodiments described above, by way of example, detection windows each having a time length corresponding to the determined detection window size occur successively without overlapping each other (see FIG. 18). However, the detection windows which are period corresponding to the detection window size do not necessarily need to occur without overlapping. As illustrated in FIG. 26, the gateway (the abnormality detection apparatus) may count the number of frames received from a bus individually for each ID also in a detection window TA which partially overlap a detection window T1 and may generate a feature vector whose components indicate the numbers of received frames (the counts) for the respective IDs, and may employ the resultant feature vector as feature information. In this case, for example, the gateway may transmit, to the server, the feature information together with information indicating an offset time indicating a difference between a start time of the detection window TA and a reference start time (for example, a start time of a preceding detection window T1). Furthermore, for example, the start time of each detection window with a length corresponding to the detection window size (for example, 10 ms) may be set such that the start time occurs at fixed time intervals (for example, every 1 ms). Furthermore, the start time of the detection window may be set such that the detection window starts when a frame of a particular ID is received from a bus.

(2) In the embodiments described above, by way of example, the gateway 300 or 1300 having the capability of transferring a data frame (a message) serves as the abnormality detection apparatus that detects an abnormality. However, the abnormality detection apparatus does not necessarily need to have the transfer capability, but an apparatus that is connected to one or more buses but that does not have the transfer capability may be used as the abnormality detection apparatus. The abnormality detection apparatus may be an ECU having an abnormality detection function and also an additional function other than the abnormality detection function. Furthermore, for example, the abnormality detection apparatus may not have one or more constituent elements in the gateway 300 or 1300. In this case, the one or more constituent elements in the gateway 300 or 1300 may be moved to another ECU.

(3) In the embodiments described above, the data frame (message) according to the CAN protocol is described in the standard ID format (see FIG. 2). Alternatively, an extended ID format may be used, and the message ID may be an extended ID or the like in the extended ID format. The CAN protocol used in the embodiments described above may be interpreted in a broad sense. That is, the CAN protocol may include derivative protocols such as TTCAN (Time-Triggered CAN), CANFD (CAN with Flexible DataRate), and the like. The foregoing embodiments are described using an example in which a vehicle includes an on-board network (on-board network system) that communicates in accordance with the CAN protocol, but the foregoing embodiments are not limited thereto, and the network class (communication protocol) may be of any type. For example, the on-board network may also be TTCAN, CAN-FD, Ethernet (registered trademark), local interconnect network (LIN), FlexRay (registered trademark), or the like, or a combination of the above. In the above embodiments, the cyber security countermeasure on an on-board network mounted in an automobile has been described, but the applicable range is not limited thereto. The technology according to the present disclosure is not limited to an automobile, and is also applicable to mobility such as a construction machine, an agricultural machine, a ship, a railway, an airplane, or the like. That is to say, the technology according to the present disclosure is applicable to a mobility network and a mobility network system. Further the technology according to the present disclosure is also applicable to a communication network used in an industrial control system such as a factory or a building, or a communication network for controlling an embedded device.

(4) In the first embodiment described above, by way of example, the gateway 300 includes the external communication unit 360. However, communication may be performed via a head unit or another ECU (an apparatus having a function of communication with the outside of the vehicle) connected to the on-board network. The head unit is an ECU having a function of communicating with the outside of the vehicle to achieve, for example, a multimedia playback function, car navigation function, or the like. In the on-board network, in a case where a diagnostic tool (failure diagnosis tool) or the like connected to a diagnostic port such as OBD2 (On-Board Diagnostics2) or the like has a function of communicating with the server 400, the gateway 300 may communicate with the server 400 via this diagnostic tool.

(5) In the embodiments described above, the gateways 300 and 1300 each judge that the state is abnormal when the feature information based on the number of frames received in a period corresponding to the detection window size, individually counted for each ID, is inconsistent with the criterion indicated by the particular model. For example, the content indicated by the particular model may be inverted, and the judgment may be performed such that when the feature information is consistent (not inconsistent) with the particular model, it is judged that the state is abnormal, while when the feature information is inconsistent with the particular model, it is judged that the state is normal. In the first embodiment described above, by way of example, only when the abnormality detection result indicates an abnormality, the gateway 300 transmits the abnormality detection result to the server 400, and the server 400 stores the abnormality detection result. However, the abnormality detection result may be stored also when the abnormality detection result indicates a normality.

(6) In the embodiments described above, by way of example, the gateways 300 and 1300 count, individually for each ID, the number of data frames received from the bus within the detection window which is the period corresponding to the detection window size, and generate the feature information based on the number (the count) of received data frames. Alternatively, the feature information may be generated based on the total count altogether for all IDs (the total number of received data frames altogether for all IDs). In this case, the number of received data frames may be counted altogether regardless of the IDs. The criterion model or the particular model may be constructed in a form corresponding to the feature information generated in the above-described manner (that is, the criterion model or the particular model may be constructed so as to indicate the criterion in terms of the frequency of occurrence of frames without distinguishing the IDs).

(7) In the embodiments described above, by way of example, the particular model indicates the criterion to be compared with the feature information based on the number of frames received by the gateway 300 or 1300 from the bus in the period corresponding to the detection window size (that is, the particular model indicates the criterion to be satisfied by the feature information). Alternatively, the particular model may be constructed so as to indicate a criterion to be compared with a frame received from the bus. In this case, steps S1602 and S1603 in FIG. 20 and FIG. 25 may be removed, and a judgment may be performed in step S1604 as to whether a frame received from the bus is consistent (or inconsistent) with the criterion indicated by the particular model. In the first embodiment described above, by way of example, the gateway 300 performs the conversion process to generate the feature information and transmits the generated feature information to the server 400 (for example, in steps S1404 and S1405a). Alternatively, the gateway 300 may transmit the ID and the reception time of each frame received from the bus to the server 400, and the conversion process may be performed by the server 400.

(8) The log associated with the abnormality detection result according to the embodiments described above may be stored in an apparatus (for example, an apparatus dedicated to storing data installed in the vehicle, a head unit having a sufficiently large storage space, or the like) other than the server 400 and the gateway 1300. The information described in the log may be read out as required and may be used in managing the vehicle or designing or building the model used in detecting an abnormality.

(9) In the embodiments described above, it is assumed by way of example that the gateway and other ECUs are apparatuses which include, for example, a digital circuit such as a processor, a memory, or the like, an analog circuit, a communication circuit, or the like. However, they may include other hardware components such as a hard disk apparatus, a display, a keyboard, a mouse, or the like. In each apparatus according to any embodiment described above, instead of realizing functions by software by executing control programs stored in a memory by a processor, functions may be realized by dedicated hardware (a digital circuit or the like).

(10) Part or all of the constituent elements of each apparatus in the embodiment described above may be implemented in a single system LSI (Large Scale Integration). The system LSI is a super-multifunction LSI produced such that a plurality of parts are integrated on a single chip. More specifically, the system LSI is a computer system including a microprocessor, a ROM, a RAM, and so on. A computer program is stored in the RAM. In the system LSI, the microprocessor operates according to the computer program thereby achieving the function of the system LSI. Each of the constituent elements of each apparatus described above may be integrated separately on a single chip, or part of all of the apparatus may be integrated on a single chip. The LSI here may be referred to as an IC, a system LSI, a super LSI, or an ultra LSI depending on a difference in the degree of integration. The technique of implementing an integrated circuit is not limited to the LSI and may be realized by using a dedicated circuit or a general-purpose processor. In addition, a FPGA (Field Programmable Gate Array) that may be programmed after the manufacture of the LSI or a reconfigurable processor in which the connections and the settings of circuit cells disposed inside the LSI may be reconfigured may be used. If future integrated circuit technology replaces LSIs as a result of the advancement of semiconductor technology or other derivative technology, the functional blocks may be integrated using the future integrated circuit technology. Biotechnology can also be applied.

(11) Part or all of the constituent elements of each apparatus described above may be implemented in the form of an IC card attachable to the apparatus or in the form of a single module. The IC card or the module is a computer system including a microprocessor, a ROM, a RAM, and so on. The IC card or the module may include the super-multifunction LSI described above. In the IC card or the module, the microprocessor operates according to the computer program thereby achieving the function of the IC card or the module. The IC card or the module may be configured so as to be resistant against tampering.

(12) In an aspect of the present disclosure, for example, the abnormality detection method may include all or part of the procedure illustrated in FIG. 14 to FIG. 17, FIG. 19, FIG. 20, FIG. 23 to FIG. 25, or elsewhere. For example, the abnormality detection method may be an abnormality detection method for detecting an abnormality in an on-board network system, the on-board network system including a plurality of ECUs that transmit and receive messages via a bus in a vehicle according to a CAN protocol, the abnormality detection method including determining a unit time (for example, a time corresponding to the detection window size), performing an operation process using feature information based on the number of messages received via the bus within the determined unit time and using a particular model indicating a criterion in terms of a message occurrence frequency and making a judgment according to a result of the operation process as to an abnormality. The unit time may be determined, for example, based on vehicle identification information, identification information identifying a person or the like related to the vehicle, or other information. The message includes a message ID indicating a message type, and the abnormality detection method includes the steps of, for example, determining the unit time based on the vehicle identification information for identifying the vehicle (for example, step S1305, S2303 or the like), identifying, as the feature information, a feature vector including elements which correspond to respective message IDs and each of which indicates the number of messages of the corresponding one of message IDs received from the bus within the unit time determined in the determining step (per the unit time determined most recently in a case where the determination is performed a plurality of times) (for example, step S1404 or the like), and performing an operation process using the feature information identified in the identifying step and using a particular model and then making the judgment as to an abnormality according to a result of the operation process (for example, step S1604 or the like). For example, the abnormality detection method further includes the step of sequentially updating the particular model based on a plurality of pieces of feature information sequentially identified in the identifying step (for example, step S1503, S2407 or the like). In an aspect of the present disclosure, a process associated with the abnormality detection method may be a computer program realized by a computer, or may be a digital signal according to the computer program. In an aspect, the present disclosure may be implemented by a computer readable storage medium, such as a flexible disk, a hard disk, a CD-ROM, an MO disk, a DVD disk, a DVD-ROM disk, a DVD-RAM disk, a BD (Blu-ray Disc), a semiconductor memory, or the like in which the computer program or the digital signal are stored. The present disclosure may be implemented by the digital signal stored in the storage medium described above. In an aspect, the present disclosure may be implemented by transmitting the computer program or the digital signal via a telecommunication line, a wired or wireless communication line, a network typified by the Internet, data broadcasting, or the like. In an aspect, the present disclosure may be implemented by a computer system including a microprocessor and a memory, wherein the computer program is stored in the memory and the microprocessor operates according to the computer program. The program or the digital signal may be stored in the storage medium, and the storage medium may be transported, or the program or the digital signal may be transferred via the network or the like thereby allowing the present disclosure to be implemented in another computer system.

(13) Any embodiment realized by an arbitrary combination of constituent elements and functions disclosed above in the embodiments and modifications also fall in the scope of the present disclosure.

The present disclosure is applicable to detection of an attack to an on-board network.

What is claimed is:
1. A method for an on-board network system, the on-board network system including a plurality of electronic controllers that transmit and receive messages via a bus in a vehicle according to a Controller Area Network protocol, each of the plurality of electronic controllers transmitting the messages periodically at fixed intervals, the method comprising:
 determining, by at least one of a processor and a circuit, a unit time;
 counting, by the at least one of the processor and the circuit, a number of the messages received from the bus in a detection window, the detection window having a time period equal to the determined unit time;
 generating, by the at least one of the processor and the circuit, at the end of the detection window, feature information based on the number of the messages received from the bus in the detection window; and
 judging, by the at least one of the processor and the circuit, whether one of the messages received from the bus is abnormal or not according to a result of an operation process, the operation process being performed using the feature information and a model, the model indicating a criterion in terms of message occurrence frequency,
 wherein in the determining, the unit time is determined every predefined time period,
 in the generating, the feature information is generated based on the number of the messages received from the bus in the detection window, the generating being performed sequentially for every period having a length equal to the determined unit time, and
 in the judging, the operation process is performed using the model and each piece of the sequentially generated feature information.

2. The method according to claim 1, wherein each of the messages includes a message ID indicating a message type,
 and the method further comprises:
  identifying, as the feature information, a feature vector including components assigned to respective message IDs corresponding to the number of the messages received from the bus in the detection window and respectively indicating numbers of the messages having the assigned message IDs which are received from the bus in the detection window.

3. The method according to claim 2, wherein, in the determining, the unit time is determined based on vehicle identification information for identifying the vehicle.

4. The method according to claim 3, wherein the vehicle identification information indicates a manufacturer of the vehicle.

5. The method according to claim 3, wherein the vehicle identification information indicates a type of the vehicle.

6. The method according to claim 3, wherein the vehicle identification information is information that distinguishes the vehicle from other vehicles.

7. The method according to claim 3, wherein, in the determining, the unit time is determined to be equal to a transmission period of one type of message which is shortest among a plurality of different types of messages to be transmitted in a normal state via a specified in-vehicle bus in a specified on-board network system of a specified vehicle, the specified vehicle included in a set of vehicles and identified by the vehicle identification information.

8. The method according to claim 3, wherein the model corresponds to the vehicle identification information.

9. The method according to claim 2,
 further comprising:
  sequentially updating the model based on each piece of the sequentially generated feature information.

10. The method according to claim 2, wherein
 in the determining, the unit time is determined in the vehicle based on information defined when the vehicle was produced, and
 in the identifying, the feature information is identified in the vehicle.

11. The method according to claim 2, wherein
 in the determining, the unit time is determined in the vehicle when an engine or an accessory of the vehicle is turned on, and
 in the identifying, the feature information is identified in the vehicle.

12. The method according to claim 1, wherein
 each of the messages includes a message ID indicating a message type, and
 the feature information indicates a total number of all of the messages received from the bus in the detection window.

13. An apparatus in an on-board network system, the on-board network system including a plurality of electronic controllers that transmit and receive messages via a bus in a vehicle according to a Controller Area Network protocol, each of the plurality of electronic controllers transmitting the messages periodically at fixed intervals, the apparatus connected to the bus, the apparatus comprising:
 processing circuitry; and
 a storage including at least one set of instructions that, when executed by the processing circuitry, causes the processing circuitry to perform operations including:
  receiving the messages from the bus;
  determining a unit time;
  counting a number of the messages received from the bus in a detection window, the detection window having a time period equal to the determined unit time;
  generating, at the end of the detection window, feature information based on the number of the messages received from the bus in the detection window; and
  judging whether one of the messages received from the bus is abnormal or not according to a result of an operation process, the operation process being performed using the feature information and a model, the model indicating a criterion in terms of message occurrence frequency,
 wherein in the determining, the unit time is determined every predefined time period,
 in the generating, the feature information is generated based on the number of the messages received from the bus in the detection window, the generating being performed sequentially for every period having a length equal to the determined unit time, and
 in the judging, the operation process is performed using the model and each piece of the sequentially generated feature information.

14. An abnormality detection system, comprising:
 one vehicle; and
 a server,
 wherein the one vehicle includes an on-board network system and an abnormality detection apparatus, the on-board network system including a plurality of electronic controllers that transmit and receive messages via a bus in the one vehicle according to a Controller Area Network protocol, each of the plurality of electronic controllers transmitting the messages periodically at fixed intervals, the abnormality detection apparatus being connected to the bus, the abnormality detection apparatus includes:
   first processing circuitry; and
   a first storage including at least a first set of instructions that, when executed by the first processing circuitry, causes the first processing circuitry to perform first operations including:
      receiving the messages from the bus;
      transmitting vehicle identification information for identifying the one vehicle to the server and determining a unit time based on a response returned from the server;
      counting a number of the messages received from the bus in a detection window, the detection window having a time period equal to the determined unit time;
      generating, at the end of the detection window, feature information based on the number of the messages received from the bus in the detection window; and
      judging whether one of the messages received from the bus is abnormal or not according to a result of an operation process, the operation process being performed using the feature information and a model, the model indicating a criterion in terms of message occurrence frequency,
the server includes:
   second processing circuitry; and
   a second storage including at least a second set of instructions that, when executed by the second processing circuitry, causes the second processing circuitry to perform second operations including:
      receiving the vehicle identification information from the one vehicle; and
      transmitting, to the one vehicle, information indicating the unit time, the unit time being identified based on the vehicle identification information,
in the determining, the abnormality detection apparatus determines the unit time every predefined time period,
in the generating, the abnormality detection apparatus generates the feature information based on the number of the messages received from the bus in the detection window, with the generating being performed sequentially for every period having a length equal to the determined unit time, and
in the judging, the operation process is performed using the model and each piece of the sequentially generated feature information.

15. The abnormality detection system according to claim 14, wherein
the second operations further include:
   acquiring particular information based on the number of the messages received from the bus in the detection window, based on the vehicle identification information received from the one vehicle, from a specified bus in a specified vehicle in a specified on-board network system, the specified vehicle specified from one or more vehicles in a set of vehicles identified by the vehicle identification information;
   updating, based on the particular information, the model indicating the criterion in terms of the message occurrence frequency; and
   transmitting, to the one vehicle, information indicating the updated model, and the first operations further include:
   updating the model based on the information indicating the updated model transmitted by the server, and
   performing the operation process using the feature information and the updated model, and performing the judging as to whether the one of the messages is abnormal or not according to a result of the operation process.

16. A method for an on-board network system, the on-board network system including a plurality of electronic controllers that transmit and receive messages via a network in a mobility entity, each of the plurality of electronic controllers transmitting the messages periodically at fixed intervals, the method comprising:
   determining, by at least one of a processor and a circuit, a unit time;
   counting, by the at least one of the processor and the circuit, a number of the messages received from the network in a detection window, the detection window having a time period equal to the determined unit time;
   generating, by the at least one of the processor and the circuit, at the end of the detection window, feature information based on the number of the messages received from the network in the detection window; and
   judging, by the at least one of the processor and the circuit, whether one of the messages received from the network is abnormal or not according to a result of an operation process, the operation process being performed using the feature information and a model, the model indicating a criterion in terms of message occurrence frequency,
wherein in the determining, the unit time is determined every predefined time period,
in the generating, the feature information is generated based on the number of the messages received from the network in the detection window, the generating being performed sequentially for every period having a length equal to the determined unit time, and
in the judging, the operation process is performed using the model and each piece of the sequentially generated feature information.

* * * * *